United States Patent
Singh et al.

(10) Patent No.: US 12,525,027 B2
(45) Date of Patent: Jan. 13, 2026

(54) USING SCENE DEPENDENT OBJECT QUERIES TO GENERATE BOUNDING BOXES

(71) Applicant: Motional AD LLC, Boston, MA (US)

(72) Inventors: Apoorv Singh, Pittsburgh, PA (US); Varun Kumar Reddy Bankiti, Seattle, WA (US)

(73) Assignee: Motional AD LLC, Boston, MA (US)

( * ) Notice: Subject to any disclaimer, the term of this patent is extended or adjusted under 35 U.S.C. 154(b) by 319 days.

(21) Appl. No.: 18/320,923

(22) Filed: May 19, 2023

(65) Prior Publication Data

US 2024/0127597 A1  Apr. 18, 2024

Related U.S. Application Data

(60) Provisional application No. 63/484,428, filed on Feb. 10, 2023, provisional application No. 63/379,700, filed on Oct. 14, 2022.

(51) Int. Cl.
| | |
|---|---|
| G06V 20/58 | (2022.01) |
| G06F 16/532 | (2019.01) |
| G06V 10/77 | (2022.01) |
| H04N 23/90 | (2023.01) |

(52) U.S. Cl.
CPC ............ *G06V 20/58* (2022.01); *G06F 16/532* (2019.01); *G06V 10/7715* (2022.01); *H04N 23/90* (2023.01)

(58) Field of Classification Search
USPC .................................................. 382/103, 104
See application file for complete search history.

(56) References Cited

U.S. PATENT DOCUMENTS

| | | | |
|---|---|---|---|
| 11,055,566 B1* | 7/2021 | Pham ..................... | G06V 10/82 |
| 11,681,919 B2* | 6/2023 | Pham .................. | G06F 18/2113 |
| | | | 382/173 |
| 12,080,078 B2* | 9/2024 | Smolyanskiy ....... | G06V 10/803 |
| 12,236,614 B2* | 2/2025 | Lyu ......................... | G06V 20/70 |
| 12,272,120 B2* | 4/2025 | Park ........................ | G06V 10/26 |
| 2021/0027448 A1* | 1/2021 | Cohen ................. | G06F 16/5838 |
| 2023/0038578 A1* | 2/2023 | Hotson .................. | G06V 20/64 |
| 2023/0095533 A1* | 3/2023 | Wong ................... | G06V 10/761 |
| | | | 382/181 |
| 2024/0085536 A1 | 3/2024 | Fu et al. | |
| 2024/0096074 A1* | 3/2024 | Okorn .................. | G06N 3/0455 |

(Continued)

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

(Continued)

*Primary Examiner* — Ishrat I Sherali
(74) *Attorney, Agent, or Firm* — Knobbe, Martens, Olson & Bear, LLP

(57) ABSTRACT

A perception system may be used to generate bounding boxes for objects in a vehicle scene. The perception system may receive images and feature maps corresponding to the received images. The perception system may generate scene dependent object queries. The perception system may use the generate scene dependent object queries to generate one or more bounding boxes for objects in the vehicle scene.

20 Claims, 12 Drawing Sheets

(56) References Cited

U.S. PATENT DOCUMENTS

2025/0054286 A1* 2/2025 Huang .................. G06V 20/58

OTHER PUBLICATIONS

Yin, T. et al., "Center-based 3D Object Detection and Tracking", Computer Vision and Pattern Recognition, Jan. 2021, arXiv:2006.11275v2, in 12 pages.
International Search Report and Written Opinion mailed Feb. 2, 2024, in corresponding PCT/US2023/076495 (14 pages).
Zhang Tianyuan et al.: "Mutr3d: A Multi-camera Tracking Framwork via 3D-to2D Queries", 2022 IEEE/CVF Conference on Computer Vision and Patter Recognition Workshops (CVPRW), IEEE, Jun. 19, 2022, pp. 4536-4545, XP034173929.
Meinhardt Tim et al: "TrackFormer: Multi-Object Tracking with Transformers", 2022 IEEE/CVF Conference on Computer Vision and Pattern Recognition (CVPR), IEEE, Jun. 18, 2022, pp. 8834-8844, XP034192546.
Peize Sun et al.: "TransTrack: Multiple Object Tracking with Transformer", arxiv.org, Cornell University Library, 201 Olin Library Cornell University Ithaca, NY 14853, May 4, 2021, XP081952699.
Ruppel Felicia et al.: "Transformers for Object Detection in Large Point Clouds", 2022 IEEE 25$^{th}$ International Conference on Intelligent Transportation Systems (ITSC), IEEE, Oct. 8, 2022, pp. 932-938, XP034216312.
Eslam Mohamed et al.: "ST-DETR: Spatio-Temporal Object Traces Attention Detection Transformer", arxiv.org, Cornell University Library, 201 Olin Library Cornell University Ithaca, NY 14853, Jul. 24, 2021, XP091011304.
International Preliminary Report received for PCT Application No. PCT/US2023/076495, mailed Apr. 24, 2025.

* cited by examiner

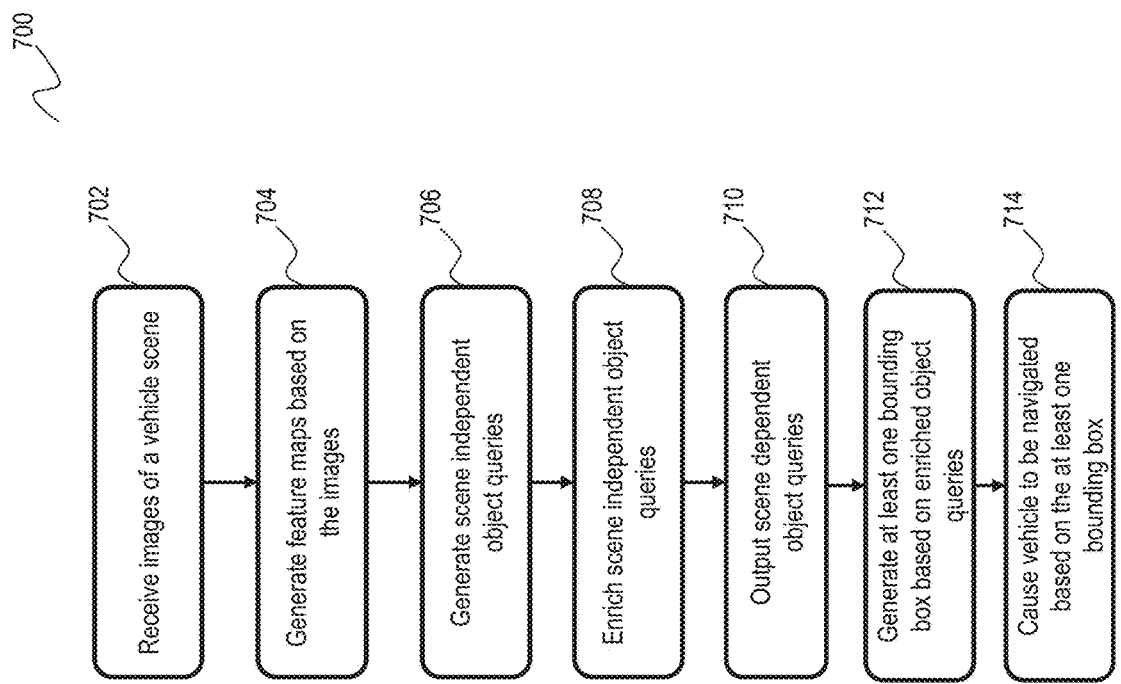

USING SCENE DEPENDENT OBJECT QUERIES TO GENERATE BOUNDING BOXES

BACKGROUND

Self-driving vehicles may generate bounding boxes for object in a vehicle scene using images obtained from one or more image sensors.

BRIEF DESCRIPTION OF THE FIGURES

FIG. 7 is a flow diagram illustrating an example of a routine implemented by at least one processor to navigate a vehicle based on at least one bounding box generated from one or more images.

DETAILED DESCRIPTION

Figure 1:
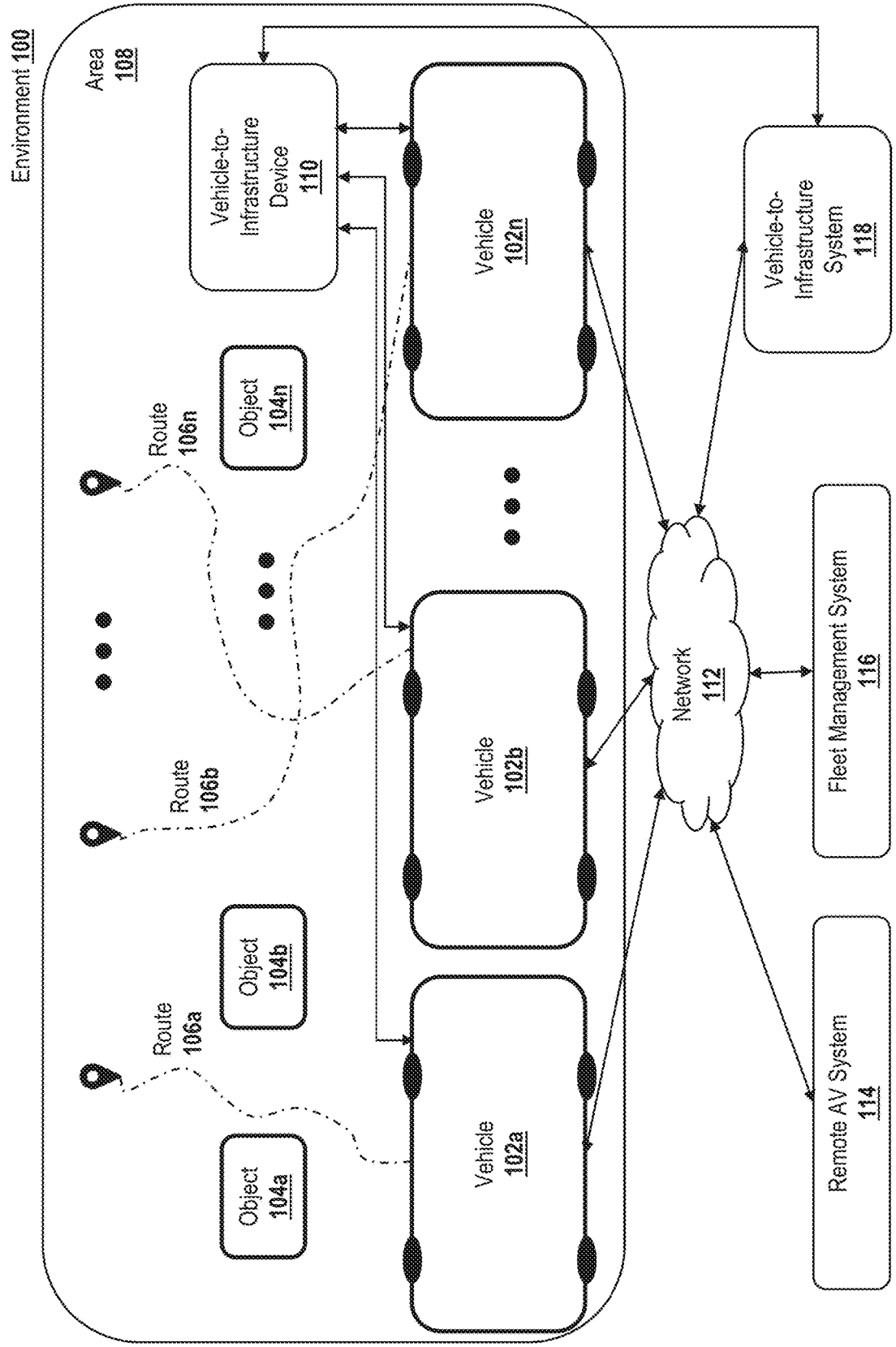
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. Also, the term "or" is used in its inclusive sense (and not in its exclusive sense) so that when used, for example, to connect a list of elements, the term "or" means one, some, or all of the elements in the list. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. As used herein, the term "if" is, optionally, construed to mean "when," "upon," "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has," "have," "having," or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

Overview

To effectively navigate through various scenes, autonomous vehicles use computer vision to identify objects in a scene and then navigate the scene based on the identified objects. As part of the navigation process, the autonomous vehicles may draw three-dimensional (3D) bounding boxes around objects in images to understand the spatial relationship of the object to the autonomous vehicle.

It can be challenging to draw accurate 3D bounding boxes on objects in a real-time driving environment, in some cases, because a neural network is unable to obtain enough semantic and local information about the objects. Moreover, individual cameras on an autonomous vehicle may not capture an entire object increasing the difficulty of identifying objects in a vehicle scene. As such, individual feature maps corresponding to the different cameras may have insufficient semantic data to enable drawing of an accurate bounding box.

To address these issues, an autonomous vehicle may utilize scene dependent object queries. Scene independent object queries can be enriched or cross correlated with each other and other image features to generate scene dependent queries. The scene dependent object queries may then be used in subsequent time steps of the scene analysis.

In the present disclosure, the system is configured to generate and utilize a combination of scene dependent object queries and scene independent object queries to generate bounding boxes. The autonomous vehicle can gather scene data associated with image capture devices (e.g., cameras) taken at a time step, which can be gathered at defined interval, such as 10 hz. The scene data can be gathered and object queries can be generated that are used to generate 3D bounding boxes associated with objects within a field of view of the vehicle.

Object queries can be calculated based on scene independent queries. A scene independent object query is a query that is generic and processed at each time step without reference to scene data collected during a previous time step. It can take a significant about of processing to converge a scene independent object query as compared to a scene dependent object query. The system can use a vision transformers to converge the object queries, which can include self-attention and cross-attention functions to converge the object queries and generate bounding boxes for objects with the image scene. For example, a scene independent object query may utilize a vision transformer with six sequential decoder layers to generate an enriched object query. This can result in processing latency for detection of objects within a time step. When the object queries are scene independent, the system processes the scene data at each time step and no benefit is gained from the previous computations. As a result, at each time step, the system may newly process 900 or more queries.

After an initialization of the system using scene independent queries, the system can generate scene dependent queries. Out of a defined number scene independent object queries (such as, for example, 900), a subset of scene dependent object queries are generated (such as, for example, 200). The scene dependent object queries may be selected from a set of enriched scene independent object queries based on a defined number of enriched queries and/or a confidence threshold associated with the enriched queries. For example, the system may select the top 200 queries with the highest confidence threshold, the number of queries that satisfy a confidence threshold, or a number of queries that satisfy a confidence threshold up to a threshold number of queries.

By using the scene dependent object queries (e.g., a subset of the enriched scene independent queries) the detection process for objects within the scene can be improved. The queries can be used to generate bounding boxes for objects with the feature map or set of feature maps. The autonomous vehicle may decrease processing demands and increase the speed and efficiency of processing the queries. These efficiencies can increase the rate at which the autonomous vehicle is able to accurately identify objects in images. For example, in some cases, the use of scene dependent object queries can reduce the number of iterations required for the queries to converge, such as from six iterations to two iterations.

In addition, the scene dependent object queries may improve the autonomous vehicle's ability to identify objects within the autonomous vehicle's scene. For example, the scene dependent object queries can improve the autonomous vehicle's ability to identify objects and determine corresponding bounding boxes.

General Overview

By virtue of the implementation of systems, methods, and computer program products described herein, an autonomous vehicle can more accurately identify objects within an image, more accurately identify the location of identified objects within the image, more accurately predict trajectories of identified objects within the image, determine additional features for identified objects, and infer additional information about the scene of an image.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
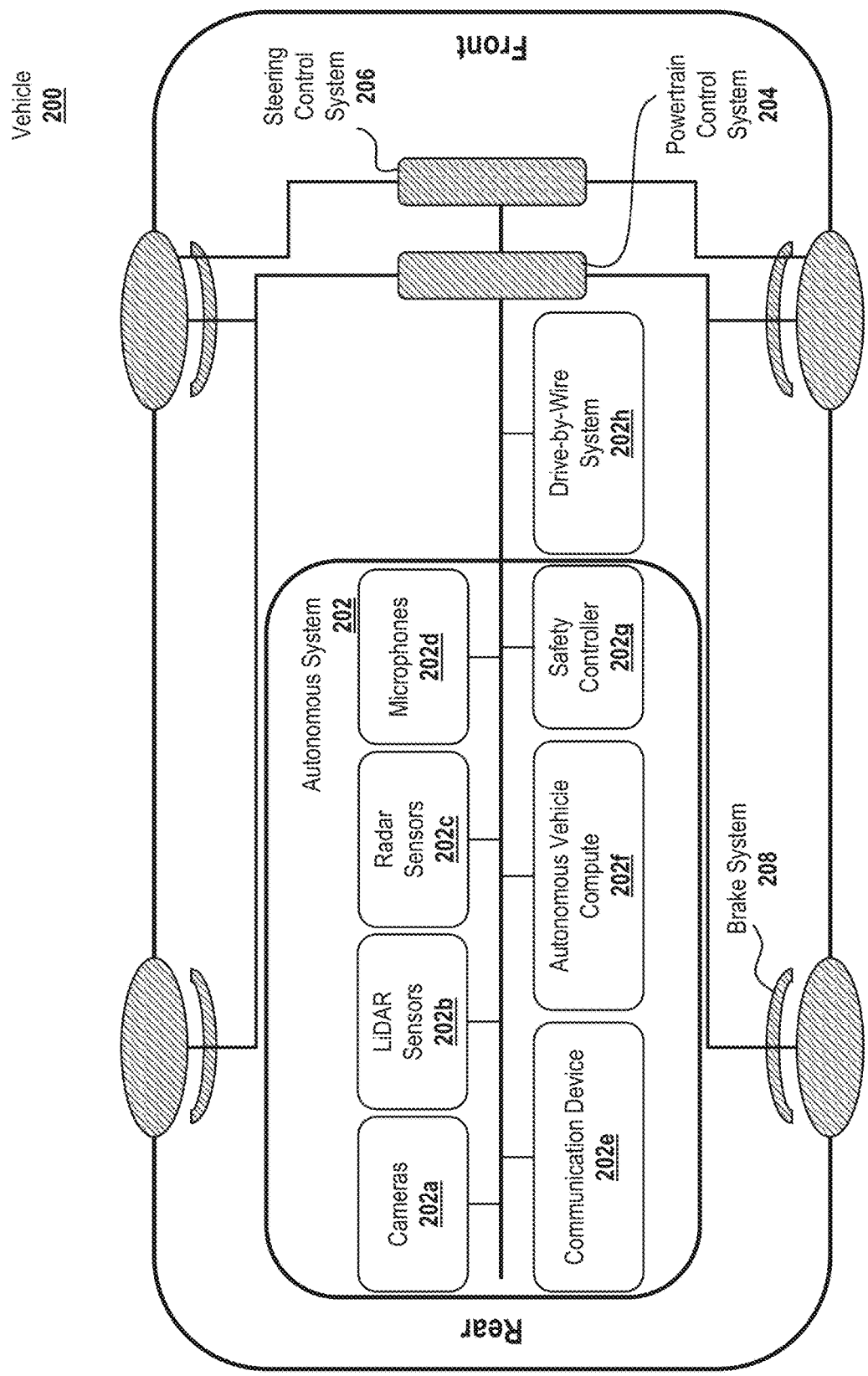
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
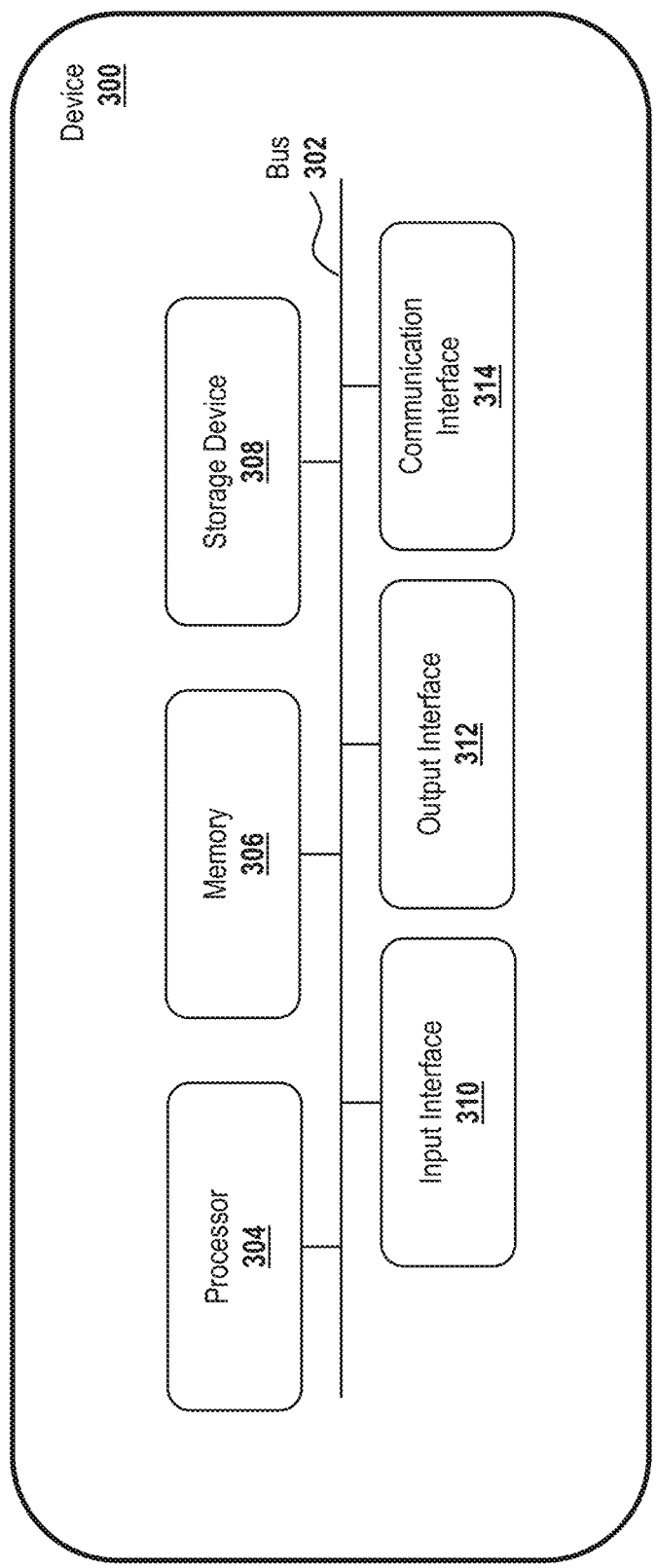
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 306 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4A:
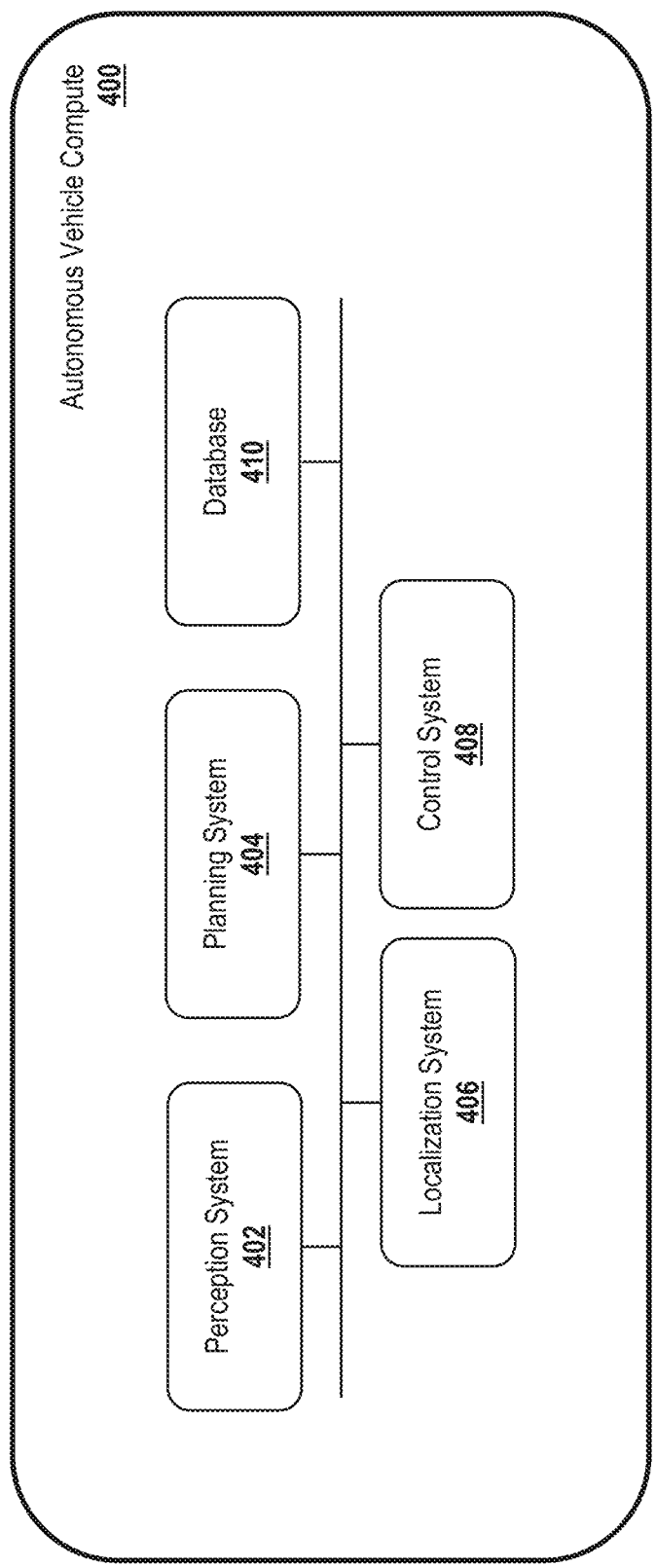
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
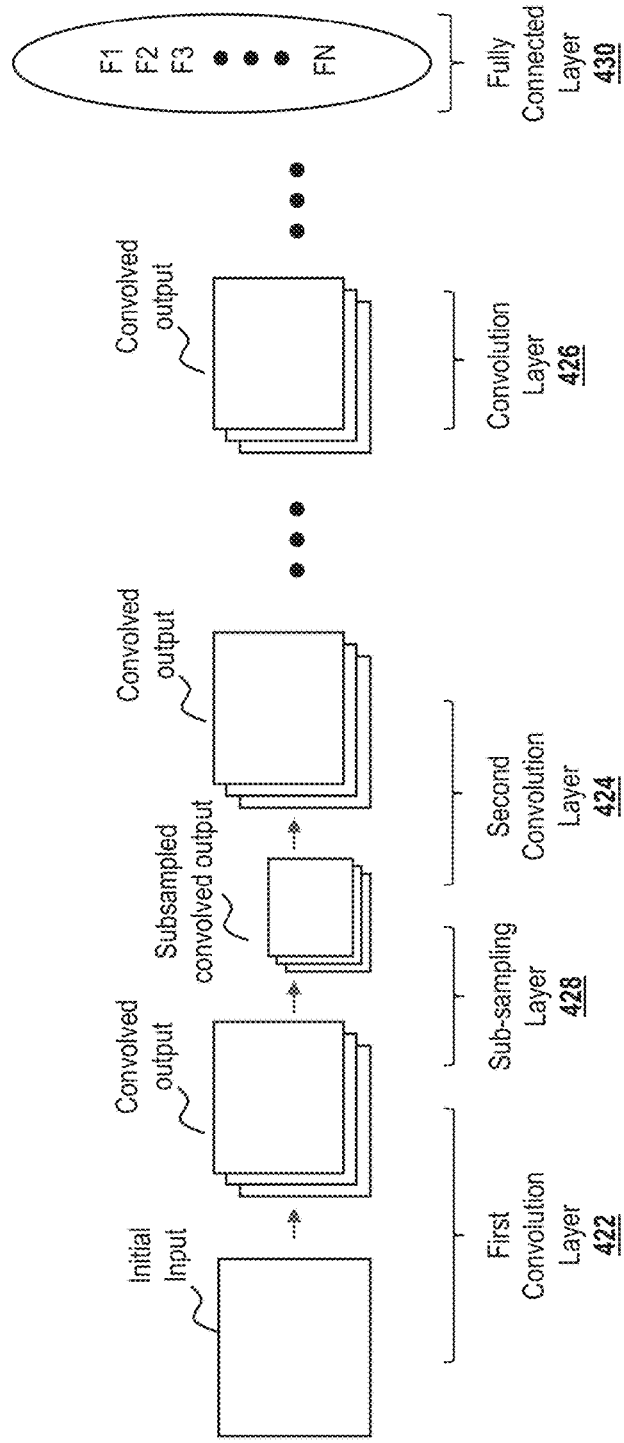
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial Input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 ... FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, ... FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
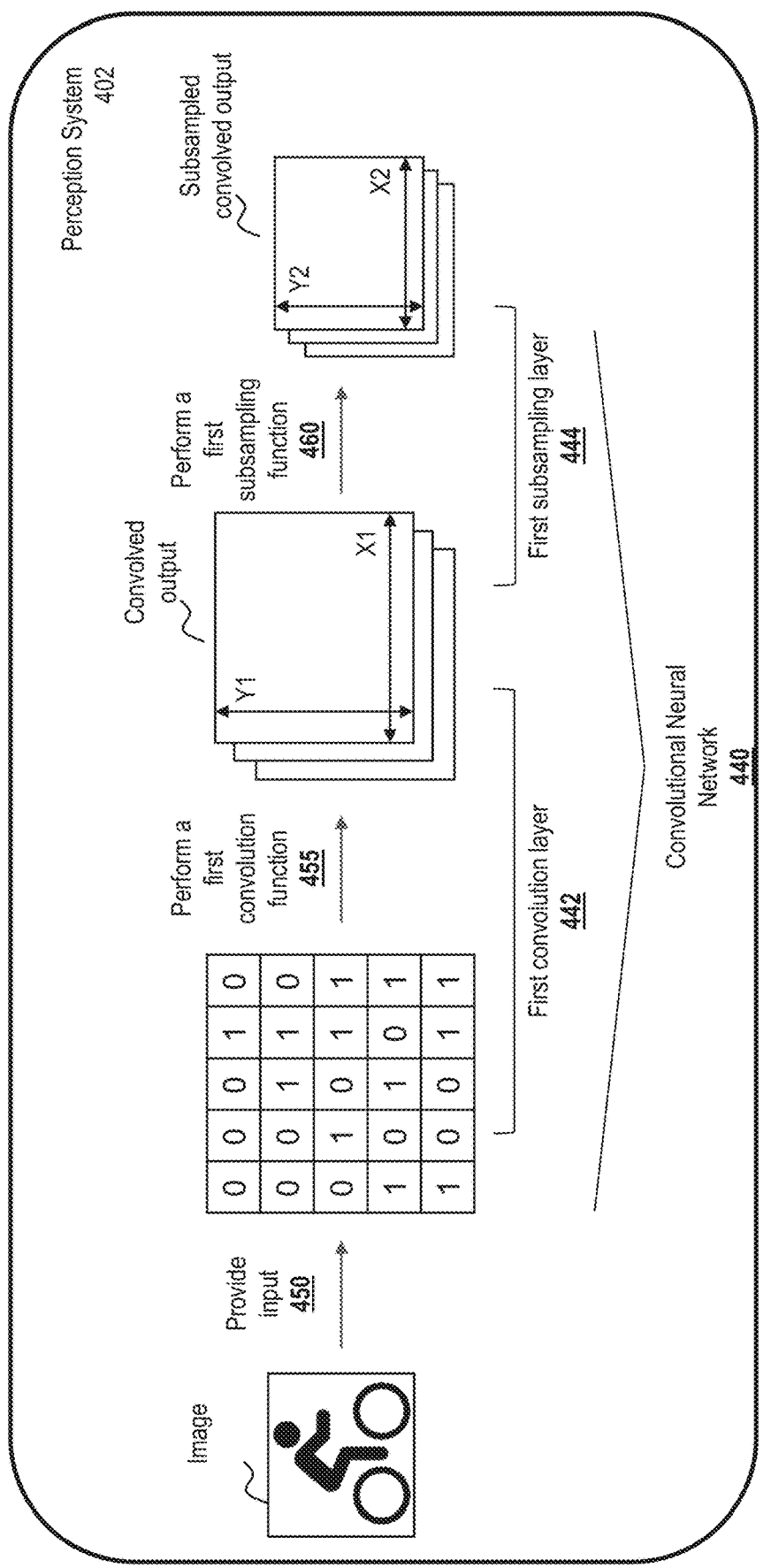
FIGS. 4C and 4D are a diagram illustrating example operation of a CNN.
Figure 4D:
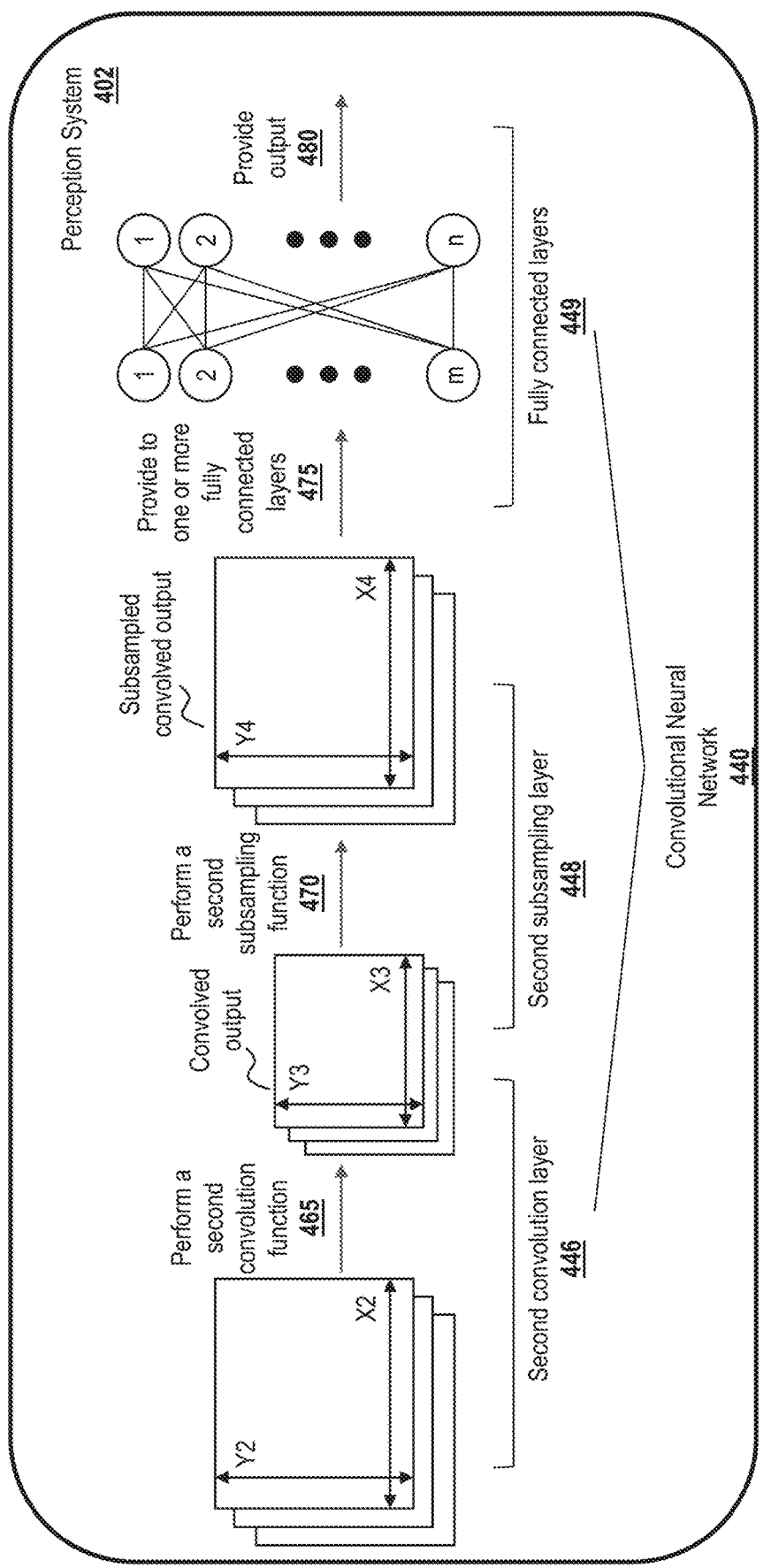

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Generating Bounding Boxes for Navigation

As described herein, to improve the functionality of an autonomous vehicle and its ability to generate bounding boxes and navigate environments in real-time, an autonomous vehicle may be configured to use feature maps and object queries to combine or relate features within the input images. In certain cases, the multiple feature maps are cross correlated with each other and the object queries. The object queries can be scene independent object queries that are generic and not based on image data associated with a previous time step of the autonomous vehicle's scene. Scene independent object queries may be enriched and used to generate scene dependent object queries that may be used in a subsequent time step.

By generating scene dependent object queries, the autonomous vehicle can generate bounding boxes using fewer compute resources, which can increase the speed of the object detection process and generation of the bounding box. Moreover, the scene dependent object queries may improve the autonomous vehicle's ability to identify objects within the autonomous vehicle's scene. For example, the scene dependent object queries can improve the autonomous vehicle's ability to determine bounding boxes for objects in a vehicle scene.

The autonomous vehicle may also generate object queries and enrich the object queries to generate scene dependent object queries using the feature maps and/or features from other object queries. The scene dependent object queries may improve the autonomous vehicle's ability to identify objects within the autonomous vehicle's scene.

Figure 5:
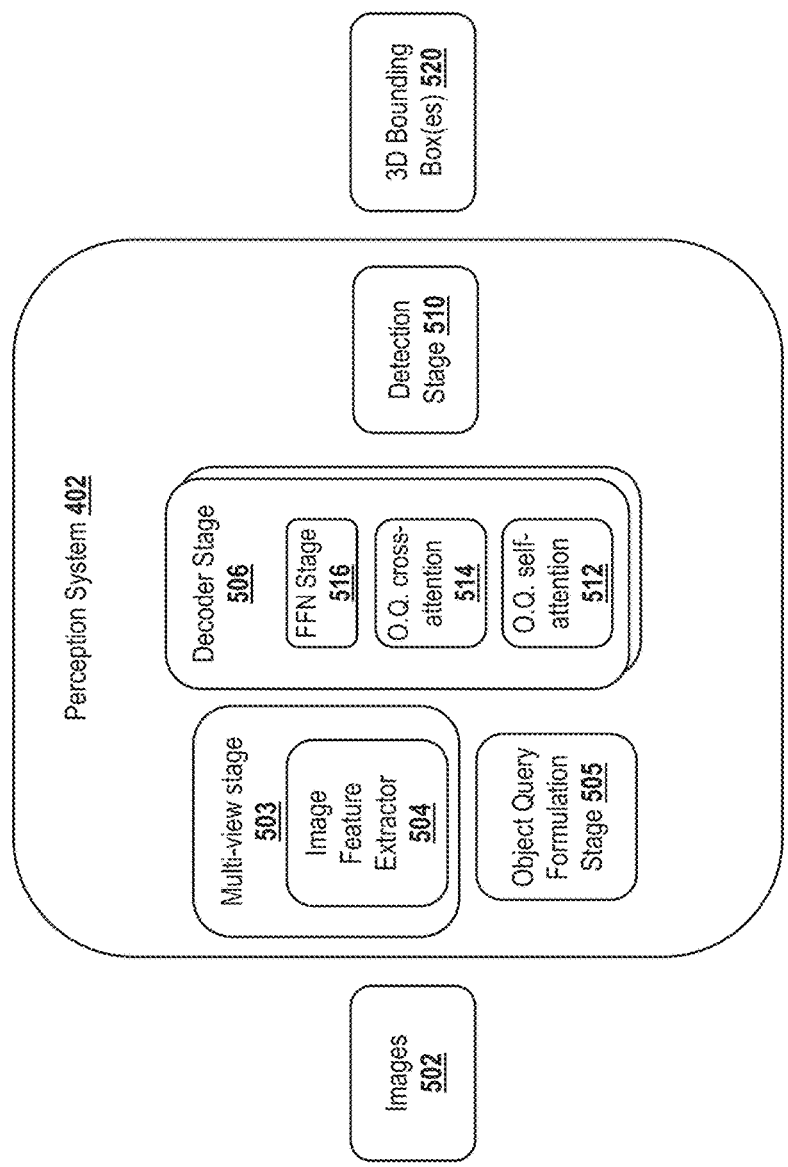
FIG. 5 is a block diagram illustrating an example perception environment in which the perception system receives and processes images to provide one or more (3D) bounding boxes for objects in a vehicle scene.

FIG. 5 is a block diagram illustrating an example perception environment 500 in which the perception system 402 receives and processes images 502 to provide one or more (3D) bounding boxes 520 for objects in a vehicle scene (corresponding to the images 502). In the illustrated example, the perception system 402 includes an image feature extractor 504, an object query formulation stage 505, a decoder stage 506, and a detection stage 510. However, it will be understood that the perception system may include fewer or more components. In some cases, the perception system 402 may omit the object query formulation stage 505. For example, in some cases, the decoder stage 506 may output one or more object queries and may have predetermined queries and may not formulate new object queries. The various components of the perception system 402 described herein may be implemented using one or more processors and/or as one or more layers or stages of a machine learning model or neural network.

The images 502 for a particular scene (also referred to herein as a set of images 502) may include image data from one or more sensors in a sensor suite. The images 502 may include different types of images corresponding to the sensor or device used to generate them. For example, the images 502 may be camera images generated from one or more cameras, such as cameras 202a, or lidar images generated from one or more lidar sensors, such as lidar sensors 202b. Other image types can be used, such as radar images generated from one or more radar sensors (e.g., generated from radar sensors 202c). Each image may correspond to a different image sensor (or camera) that is placed at a different location around an autonomous vehicle. In some cases, the combination of images can form a 360-degree view of a scene of an autonomous vehicle from the perspective of the autonomous vehicle. As such, each image of the images 502 may be neighbor or border another of the images 502 and some objects (or parts of an object) may show up in different images of the images 502.

Moreover, the images 502 of a set of images may be generated at approximately the same time and may form part of a stream of different images. As such, the images 502 may represent the scene of a vehicle at a particular time, or time step. As the perception system 402 uses the images to generate bounding boxes 520 and navigate a vehicle, it will be understood that the perception system 402 may process the images 502 in real-time or near real-time to generate the bounding boxes 520.

Multi-View Stage

The image feature extractor 504 may be implemented using one or more neural networks or layers of a neural network to extract features from the images 502. In some cases, the image feature extractor 504 may be implemented using backbones with a feature pyramid network (FPN), residual networks (Resnet), or Swin transformer, CSWin transformer, vision transformer (ViT), etc. The image feature extractor 504 may generate one or more feature maps using the images 502. In some cases, the image feature extractor 504 generates at least one feature map for each of the images 502. For example, if the image feature extractor 504 receives six images corresponding to six cameras placed at different locations around the vehicle and oriented in different ways (e.g., to obtain a 360-degree view of the area around the vehicle), the image feature extractor 504 may generate six feature maps, respectively.

The feature maps may have the same or different shapes from the images used to generate them and/or from each other. For example, if each of the images 502 has the shape [900, 1600, 3], respective feature maps may have the shape [45, 80, 256], however, it will be understood that the feature maps may have different shapes from each other.

Each feature map of the generated feature maps may be divided into an array of grid cells having a particular channel depth. The grid cells may include semantic data (or features) extracted from (pixels in) the image(s) from which the feature map was generated. The features of a grid cell may be organized as a vector or some other tensor shape. For example, the features (or semantic data) of a grid cell may indicate a shape, light, texture, reflectivity, edge, object class, location, etc. of something detected by the image feature extractor 504.

The multi-view stage 503 may enrich feature maps by comparing and/or correlating features from different feature maps. In some cases, the multi-view stage 503 uses the features from grid cells in a group of grid cells to update each other (also referred to herein as self-attention). For example, the multi-view stage 503 may use features of a group of grid cells in one or more feature maps to enrich or modify features of a particular grid cell in the group of grid cells.

In certain cases, the multi-view stage 503 may group grid cells based on objects (e.g., group grid cells that correspond (or appear to correspond) to the same object or to an outline of the same object). In some cases, the multi-view stage 503 may group grid cells by dividing a feature map into multiple regions (also referred to herein as windows) and/or assign different grid cells of a feature map to the different regions or windows. In certain cases, the different regions or windows of the feature map may be mutually exclusive (e.g., a grid cell may be assigned to only one region or window). In certain cases, the multi-view stage 503 may divide the feature map into multiple rows or columns of regions or windows. Some or all of the regions or windows may have the same (or different) sized (e.g., width and height), and one or more of the regions may overlap with multiple feature maps corresponding to different images. The rows of windows may be aligned or offset from each other.

As described herein, by using groups of grid cells (e.g., windows or subsets of images/feature maps) for comparison and enrichment (e.g., for self-attention) instead of an entire feature map or set of feature maps, the decoder stage 506 may decrease processing demands and increase the speed and efficiency of processing the feature maps by the decoder stage 506. These efficiencies can increase the rate at which the perception system 402 is able to accurately identify objects in the images 502.

The multi-view stage 503 may compare semantic data of groups of grid cells (e.g., different grid cells within a particular window or region) with each other. Based on the comparison, the multi-view stage 503 may modify the semantic data of the different grid cells. For example, the multi-view stage 503 may compare certain features of a grid cell (e.g., color, reflectivity, shape, etc.) with corresponding features of a different grid cell in the same group (e.g., compare features of a grid cell within window 552a with corresponding features of a different grid cell within the window 552a). Based on a similarity, the multi-view stage 503 may determine a probabilistic relationship between the grid cells in the group (e.g., probability that the grid cells are part of the same object, such as a vehicle, bicycle, pedestrian, construction cone, etc.). Based on this determination, the multi-view stage 503 may update one or more features of the grid cells. For example, one grid cell may be updated to indicate that it is the middle portion of an object and another grid cell may be updated to indicate that it is the beginning of the same object, etc.

In certain cases, the multi-view stage 503 may cross correlate some or all of the features of the various grid cells within a group (e.g., within a particular region) to each other. In this way, the multi-view stage 503 may enrich some or all of the grid cells within the particular group. Moreover, the multi-view stage 503 may repeat the comparison for each of the groups (e.g., windows) of a feature map and/or across some or all of the feature maps such that some or all grid cells of the feature maps are compared/updated based on comparisons with features from other grid cells in the same group (e.g., window or region).

As described above, with reference to the self-attention of object queries, in some cases, the multi-view stage 503 may generate a matrix that includes some or all of the grid cells within a group. The multi-view stage 503 may then determine a weight or probabilistic relationship between the grid cells and include the weight in the matrix. The multi-view stage 503 may use the weights/relationships in the matrix (indicative of a relationship or weight between grid cells) to calculate updated values for the features of the different grid cells. For example, the multi-view stage 503 may update a particular value of a particular grid cell using corresponding weighted values of some or all of the other grid cells in the group. An example of such a matrix and calculation (but for object queries) is described herein with reference to the self-attention of object queries. Moreover, this process may be repeated across some or all of the groups of grid cells of a feature map and across some or all of the feature maps. For example, the image feature extractor 504 may generate multiple feature maps for each image with each feature map corresponding to one or more detected characteristics of the image. In some such cases, the windows (or other form of grouping) may be applied to some or all of the feature maps and the grid cells of the feature maps updated as described herein.

In some cases, the decoder stage 506 may include multiple layers of the multi-view stage 503. In some such cases, the groups (e.g., windows) in the different layers of the multi-view stage 503 may be different. In some cases, the windows may be sized and/or positioned differently.

Object Query Formulation Stage

The object query formulation stage 505 (also referred to herein as the formulation stage 505) may be used to initialize, seed/modify, and/or enrich object queries. Accordingly, it will be understood that the formulation stage 505 may include one or more substages, including but not limited to an initialization stage, a seeding/modifying stage, and/or an enrichment stage.

In some cases, the formulation stage 505 may initiate a particular number of object queries. In certain cases, the formulation stage 505 initiates more object queries than a number of objects expected to be found in the image(s) 502. For example, if the formulation stage 505 expects there to be no more than 400 objects in a scene of the images 502, the formulation stage 505 may initiate some number greater than 400 object queries, such as 900 object queries.

The object queries may be organized as a vector or some other tensor shape and/or may include the same or a different number of features. For example, an object query may include 256 dimension features, or fewer or more dimension features. The features, alone or in combination, may represent one or more characteristics of an object, such as, but not limited to, its class, movement, relation to other objects, whether it is foreground or background, location, shape, size, color, texture, reflectivity, etc. In some cases, the formulation stage 505 may initiate the features of an object query randomly and/or pseudo-randomly. For example, the values for the features of the object queries may include random or pseudo-random numbers.

In addition, the formulation stage 505 may seed or modify the initial (random or pseudo-random) values for the features of an object query. In some cases, the formulation stage 505 may include a localization network (or receive values from a localization network) that determines (or helps determine) a probable location of the respective object queries within the vehicle scene. In certain cases, the formulation stage 505 may use other data to seed object queries (or modify the initial values of the object queries). For example, the formulation stage 505 may use heat maps that indicate expected or probable movements or trajectories of objects within the vehicle scene to formulate the object queries.

In certain cases, the formulation stage 505 may include an object query self-attention stage (e.g., similar to the object query self-attention stage 512 described herein) that enables the object queries to self-attend and update themselves. For example, the self-attention stage of the formulation stage 505 may modify the values of a group of object queries based on the features of the object queries in the group of object queries. As described herein at least with reference to the object query self-attention stage 512, the object query self-attention stage of the formulation stage 505 may compare the features of a particular object query with the features of some or all of the other object queries (or some or all of the object features of a group of object features) to determine a correlation or similarity between the particular object query and the other object queries, use the correlation between the particular object query and the other object queries to weight the features of the various object queries, and use the weighted features to calculate a new (or modified) value for the respective features of the particular object query. In some cases, the object query self-attention stage 512 may update the features of some or all of the object queries in this way. In certain cases, the object query self-attention stage 512 may determine a matrix to indicate the relationship (or weight) between the features of the various object queries and use the matrix to update the features of some or all of the object queries. The decoder stage 506 may be used to enrich feature maps and object queries. In certain cases, the decoder stage 506 may enrich feature maps and object queries using self-attention and/or cross-attention techniques.

In the illustrated example, the decoder stage 506 includes one or more layers of an object query self-attention stage 512 and an object query cross-attention stage 514.

Decoder Stage

Different layers of the decoder stage 506 may include similar components. In the illustrated example of FIGS. 6A and 6B, a layer of the decoder stage 506 includes an object query self-attention stage 512, an object query cross-attention stage 514, and an feed forward network (FFN) stage 516. However, it will be understood that the decoder stage 506 and/or different layers of the decoder stage 506 may include different components. For example, the decoder stage 506 and/or different layers of the decoder stage 506 may include different components or different relationships between. In some cases, each layer of the decoder stage 506 includes the same components in the same relationship. In certain cases, the layers of the decoder stage 506 the components of the different layers may be configured differently or use different parameters. For example, the object query self-attention stage 512 of a first layer may use different parameters or configurations for processing the object queries than the object query self-attention stage 512 of a second layer. Similarly, different parameters may be used in different layers for the object query cross-attention stage 514, and/or the FFN stage 516, etc.

The components of a layer of the decoder stage 506 may process data in parallel or sequentially. In some cases, the output of a stage within a layer may be used as the input to another stage within the layer. For example, in the illustrated example of FIGS. 6A and 6B, the object query cross-attention stage 514 processes data output by the object query self-attention stage 512, and the FFN stage 516 processes data output by the object query cross-attention stage 514. However, it will be understood that the components of the decoder stage 506 may be aligned in a variety of configurations.

The output of one layer of the decoder stage 506 may be used as the input to a subsequent layer and the output of the last layer of the decoder stage 506 may be provided to the detection stage 510. For example, in an N-layer decoder stage 506, the output of the first layer may be used as the input of the second layer and so on until the output of the N-1 layer is used as the input of the Nth layer. In some such cases, the output of the Nth layer may be used as the input to the detection stage 510.

Object Query Self-Attention Stage

The object query self-attention stage 512 may be configured to generate and/or enrich object queries (e.g., using self-attention) using features from a group of object queries.

As described herein, there may exist many object queries and some or all of the object queries may be modified by the object query cross-attention stage 514 (e.g., using grid cells from the feature maps). In some cases, the object query self-attention stage 512 may modify or enrich the object queries by comparing the features of the object queries with each other, determining a weighting value based on the comparison and modifying the features of the object query using weighted features (weighted based on the determined weighting value). For example, the object query self-attention stage 512 may compare semantic data (or features) of an object query to determine a relationship between the object queries, such as a likelihood that the different object queries correspond to the same object or to different objects. In some cases, this may include comparing features of the object query that correspond to an object's class, movement, relation to other objects, whether it is foreground or background, color, light reflectivity, edge, texture, shape, etc. Based on the comparison, the object query self-attention stage 512 may update the object queries. In some cases, this may include modifying one or more values of a tensor corresponding to an object query.

In some cases, the object query self-attention stage 512 compares the features of a particular object query with the features of some or all of the other object queries (or some or all of the object features of a group of object features) to determine a correlation or similarity between the particular object query and the other object queries. In some cases, the correlation or similarity can be represented as a probability or weight. Using the correlation between the particular object query and the other object queries, the features of the object queries (include the particular object query) may be weighted and the weighted features may be used to calculate a new (or modified) value for the respective features of the particular object query. For example, a first feature of some or all of the object queries may be weighted (relative to the particular object query) and the weighted values used to determine a value for the first feature of the particular object query. Similarly, the other features of the particular object query may be updated (e.g., using the same or a different weighting). In some cases, the object query self-attention stage 512 may update the features of some or all of the object queries in this way. In certain cases, the object query self-attention stage 512 may determine a matrix to indicate the relationship (or weight) between the features of the various object queries and use the matrix to update the features of some or all of the object queries.

As a non-limiting example, consider the following three object queries and values for their features: Object query1 [1,4]=(0.2, 0.2, 0.4, 0.7); Object query2 [1,4]=(0.3, 0.4, 0.6, 0.7); Object query3 [1,4]=(0.1, 0.8, 0.9, 0.7).

After analyzing the features of the three object queries, assume that the object query self-attention stage 512 generates the following relationship (or weighting) matrix between them:

|  | Object Query 1 | Object Query 2 | Object Query 3 |
|---|---|---|---|
| Object Query 1 | .7 | .2 | .1 |
| Object Query 2 | .2 | .6 | .2 |
| Object Query 3 | .1 | .2 | .7 |

Based on the determined relationship or weighting, the object query self-attention stage 512 may update the values for the features of the object queries as follows:

Object query1 [1,4]=(0.21, 0.3, 0.49, 0.7) or (0.7*0.2+ 0.2*0.3+0.1*0.1, 0.7*.2+0.2*0.4+0.1*0.8, 0.7*0.4+ 0.2*0.6+0.1*0.9, 0.7*0.7+0.7*0.2+0.7*0.1).

Object query2 [1,4]=(0.24, 0.44, 0.62, 0.7) or (0.2*0.2+ 0.6*0.3+0.2*0.1, 0.2*0.2+0.6*0.4+0.2*0.8, 0.2*0.4+ 0.6*0.6+0.2*0.9, 0.2*0.7+0.6*0.7+0.2*0.7.

Object query3 [1,4]=(0.15, 0.66, 0.79, 0.7) or (0.1*0.2+ 0.2*0.3+0.7*0.1, 0.1*0.2+0.2*0.4+0.7*0.8, 0.1*0.4+ 0.2*0.6+0.7*0.9, 0.1*0.7+0.2*0.7+0.7*0.7

Object Query Cross-Attention Stage

The object query cross-attention stage 514 may be configured to enrich (a set of) object queries (e.g., using cross-attention and/or using data from another stage, such as the object query self-attention stage 512 and/or the multi-view stage 503).

In some cases, the object query cross-attention stage 514 may enrich object queries based on data received from the object query self-attention stage 512 and/or the multi-view stage 503. For example, the object query cross-attention stage 514 may use semantic data corresponding to one or more feature maps output by the multi-view stage 503 to modify or edit the object query. In some cases, this may include modifying one or more features of a tensor corresponding to the object query.

In some cases, the object query cross-attention stage 514 may correlate data from one or more feature maps enriched by the multi-view stage 503. As part of correlating the object query with one or more features maps, the object query cross-attention stage 514 may use one or more linear layers to identify one or more features in one or more feature maps. For example, the object query cross-attention stage 514 may multiply a tensor [1, N] corresponding to an object query by a learnable linear layer matrix [N, 2] to determine a location (x, y) in an (enriched) feature map that corresponds to a feature to be correlated with the object query.

The object query cross-attention stage 514 may use the features of the identified feature map to modify some or all of the features of the object query. In some cases, this may include assigning a weight to a particular feature of the object query and a weight to a corresponding feature of the identified feature map and using the result (non-limiting example: sum of the products) to modify or assign a new value to the particular feature of the object query. In certain cases, the object query cross-attention stage 514 may use a learnable linear layer matrix to identify multiple features of one or more feature maps, and use the identified features to modify the features of the object query. In some such cases, the object query cross-attention stage 514 may assign different weights to the corresponding features of the different feature maps and use the weighted features to determine a corresponding feature of the object query.

Detection Stage

The detection stage 510 uses the output of the cross-attention stage 514 to determine bounding boxes for object queries, and may be implemented using a detector, such as the CenterPoint Detector, an example of which is described in "Center-based 3D Object Detection and Tracking," Yin et al., 6 Jan. 2021 (arXiv:2006.11275v2).

Fewer, more or different components may be used as part of the perception system 402. For example, in some cases, the perception system 402 may omit one or more layers of the decoder stage. Object queries output by the decoder stage 506 may be communicated to the detection stage 510 to detect bounding boxes 520. As another example, in certain cases, the multi-view stage 503 may be omitted or combined. For example, the feature maps generated by the image feature extractor 504 may be enriched in one or more layers during the multi-view stage 503.

Figure 6A:
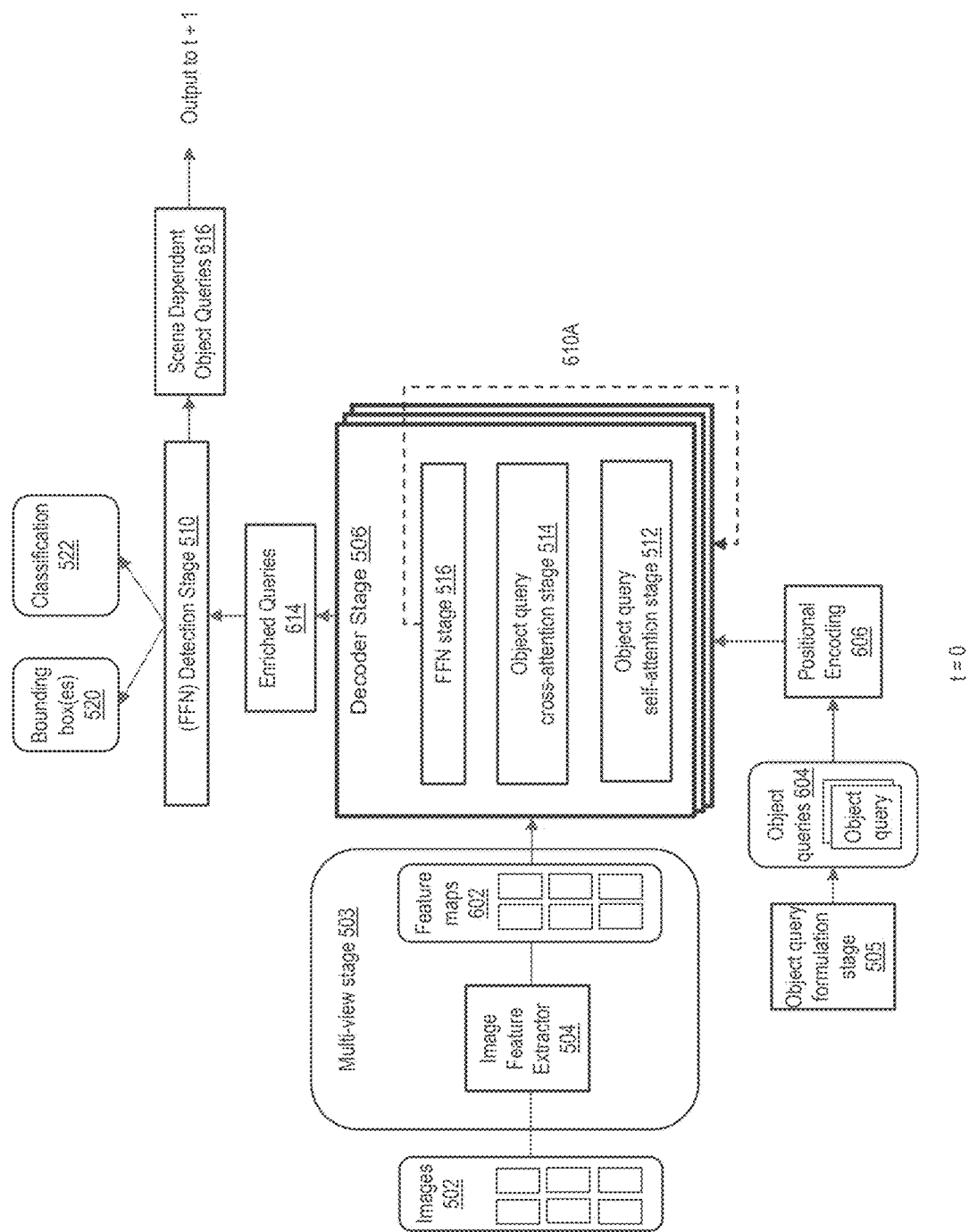
FIG. 6A is a data flow diagram illustrating an example of a perception environment in which a perception system generates bounding boxes from images.
Figure 6B:
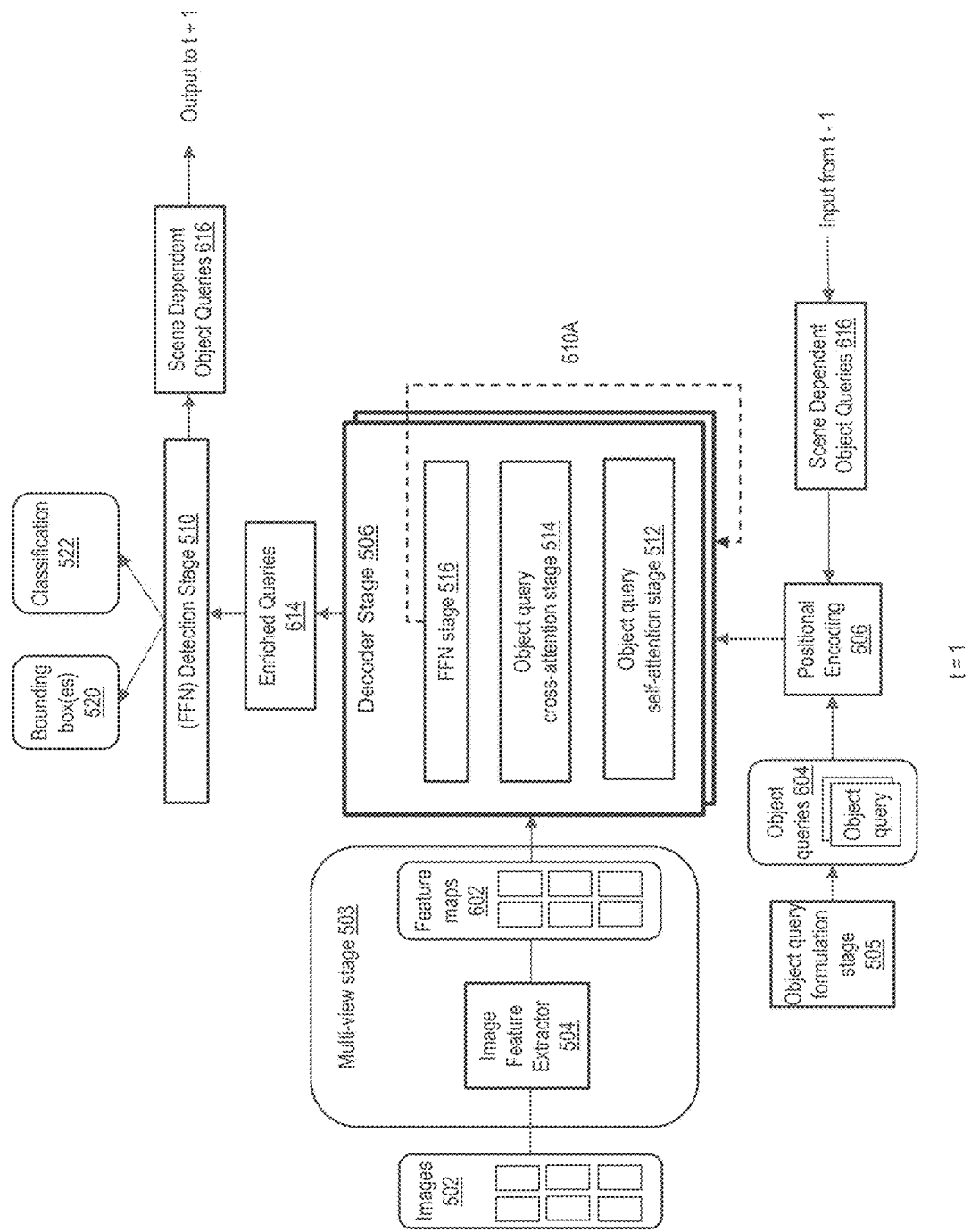
FIG. 6B is a data flow diagram illustrating an example of a perception environment in which a perception system generates bounding boxes from images.

FIG. 6A is a data flow diagram illustrating an example perception environment 600 in which a perception system 402 generates bounding boxes 520 from images 502 in an initialization stage at an initial time step (t=0). FIG. 6B illustrates the operating stage where the perception system is operating in subsequent time steps (t=1, 2, 3, etc.) after the initialization stage. In the illustrated example, two general data paths are shown: an object query data path and a feature map data path. While there is crossover of data between the two general data paths, for simplicity, the feature map data path (inclusive of the images 502, image feature extractor 504, feature maps 602, and the multi-view stage 503) will be described first followed by the object query data path (inclusive of the formulation stage 505, object queries 604, positional encoding 606, object query cross-attention stage 514, object query self-attention stage 512, and FFN stage 516).

As described herein, the images 502 may correspond to images received from different cameras (or other image sensors) around the autonomous vehicle. In the illustrated example, six images are shown, however, it will be understood that fewer or more images can be used. The images 502 may correspond to images taken at the same (or approximately same) time (e.g., within milliseconds of each other). In this way, the images may correspond to the same scene for the vehicle. Moreover, the perception system 402 may repeatedly receive images and perform the functions described herein multiple times per second as new images are received. Accordingly, it will be understood that the perception system 402 may operate in real-time or near real-time to generate bounding boxes 520 from the images 502.

As described herein, the image feature extractor 504 generates feature maps 602 from the images 502. In the illustrated example, the image feature extractor 504 generates one feature map from each of the images 502, however, it will be understood that the image feature extractor 504 may generate multiple feature maps 602 from each image of the images 502 and communicate the multiple feature maps 602 to the decoder stage 506.

Each feature map of the feature maps 602 can be divided into an array of grid cells having a particular channel depth. The grid cells may include semantic data (or features) extracted from (pixels in) the image(s) from which the feature map was generated. The features may be organized as a vector or some other tensor shape. For example, the features (or semantic data) of a grid cell may indicate a shape, light, texture, reflectivity, edge, object class, location, etc. of something detected by the image feature extractor 504.

The multi-view stage 503 can enrich the feature maps. In some cases, the multi-view stage 503 may enrich the feature maps by modifying features in a grid cell using features from another grid cell (and vice versa). As described herein, the multi-view stage 503 may cross-correlate features in grid cells within different groups (e.g., windows) of the feature maps 602.

Moreover, one or more of the groups of grid cells may overlap multiple feature maps such that grid cells in one feature map are cross correlated with grid cells from another feature map. In some such cases, the multi-view stage 503 may use windows that overlap feature maps 602 that correspond to images from cameras that are next to each other (e.g., one window may overlap a feature map corresponding to a front-view image of the vehicle and a feature map corresponding to a front-left view of the vehicle). Accordingly, features from grid cells in one feature map may be propagated to (or correlated with) features from grid cells in another (e.g., neighboring, adjoining, or bordering) feature map.

In addition, the groups of grid cells (e.g., windows) used for self-attending grid cells in one layer may differ from the groups of grid cells in another layer. For example, the groups of grid cells used by the multi-view stage 503 in a first layer may differ from the groups of grid cells used in a second layer. In some cases, the windows used by the multi-view stage 503 in a second layer may be shifted in one or more directions relative to windows used by the multi-view stage 503 in the first layer. Subsequent layers may include additional shifts or oscillate between the placement of windows in the first layer and the placement of windows in the second layer. Moreover, depending on how the windows are aligned, a portion of a window may include opposite ends or corners of feature maps. For example, a window may include a bottom right corner of one feature map and a top left corner of another (e.g., adjoining or neighboring) feature map.

With reference to the object query data path, the formulation stage 505 generates object queries 604. As described herein, the formulation stage 505 may generate and/or initialize the object queries 604 concurrent to the image feature extractor 504 generating the feature maps 602. As described herein, in generating the object queries 604, the formulation stage 505 may initialize the features of the object queries randomly or pseudo randomly.

The formulation stage 505 may also use features from the feature maps 602, other feature maps (e.g., from a localization network) or other data (e.g., heat map data associated with a heatmap), etc., to generate the object queries 604. As described herein, in some cases, this may include using a linear layer matrix to identify a grid cell, and cross-attending the features of the identified grid cell with the features of the object query using weighted features of the grid cell. In addition, in some cases, the formulation stage 505 may include a self-attention stage to enable the grid cells to cross-correlate or associate features and update themselves.

The positional encoding 606 can provide context data associated with the position of the input vectors within the dataset. The positional encoding can be used to identify positions of the grid cells within the feature maps. The positional encoding can be added to corresponding input vectors. For example, the positional encodings can have same dimension as the queries. The positional encoding can depend the position of the vector, the index within the vector, and the dimension of the input.

The formulation stage 505 communicates the object queries 604 to the decoder stage 506 for further processing. (e.g., the object query self-attention stage 512 of the decoder stage 506). The object query self-attention stage 512 may enrich the object queries 604. For example, the object query self-attention stage 512 may compare the features of the object queries 604 to determine a probabilistic relationship between them, generate a weighting value based on the probabilistic relationship, and modify the features of one object query based on weighted features (weighted using the weighting value) from other object queries. In some cases, the object query self-attention stage 512 may use a similar technique to enrich some or all of the object queries 604 to provide the enriched object queries 614 such that the semantic data from some or all of the object queries 604 is updated or enriched.

As described herein, the object query cross-attention stage 514 may enrich the object queries 604 using the feature maps 602. In some cases, the object query cross-attention stage 514 enriches the object queries 604 in a manner that is similar to the way in which the formulation stage 505 generates the object queries 604 using the feature maps 602. For example, the object query cross-attention stage 514 may identify grid cell(s) in the feature maps 602 that correspond to a particular object query of the object queries 604, weight the features, and/or use the (weighted) features of the identified grid cell(s) to modify or enrich the features of the particular object query. In some cases, the object query cross-attention stage 514 may use a similar technique to enrich some or all of the object queries 604.

After the object query cross-attention stage 514 the FFN stage 516 may transform the object queries to a defined dimensional output. The FFN stage can converge the output of the cross-attention stage 514 to a 256 value vector. The FFN stage 516 can converge the vector to a lower space embedding. The output of the FFN stage 516 can be provided to the next layer of the decoder for processing until the total number of layers has been completed.

Each stage, such as the self-attention stage 512, the cross-attention stage 514, and the FFN stage 516 may be followed by layer normalization processes. The normalization process can be a normalization process used in the art, such as batch normalization, weight normalization, layer normalization, group normalization, weight standardization or another normalization process.

As described herein, there may be multiple layers in the decoder stage 506 for the object query cross-attention stage 514 and object query self-attention stage 512 such that enriched object queries 614 generated in a first layer of the decoder stage 506 are communicated to a second layer (e.g., a second object query cross-attention stage 514 and/or second object query self-attention stage 512) as illustrated by the dashed line 610A and so on. In some cases, there may be 2, 4, 6, or more layers. During the initialization stage at t=0, more layers are used in order to initialize the system and generate the initial scene dependent object queries 614. In subsequent time steps (illustrated in FIG. 6B), the decoder stage 506 has less layers than in the initialization stage. For example, in one embodiment, in the initialization stage, the decoder stage 506 has six layers and, in the operation stage, the decoder stage 506 has two layers.

After the decoder stage finishes processing all of the layers (during initialization or operation), the output is a set of enriched queries 614. The set of enriched queries 614 is machine representations (e.g., a 256 value vector) of the queries. There is an enriched query 614 for each object query 604 input into the decoder stage.

The detection stage 510 outputs bounding boxes 520 based on the enriched queries. The detection stage 510 can be a feed-forward network. In some embodiments, the FFN may predict coordinates, of a bounding box with respect to the input image, and predict the classification 522 associated with the bounding box.

Each query has a determined confidence value associated with each identified class. The FFN can use the class to determine the type of objects that are identified by a query. The FFN may have a defined number of detectable classes. For queries that identify an object within a class, the FFN may have a confidence threshold for determining whether to generate a bounding box associated with a specific query. The FFN may only use the highest confidence value of the class to determine whether to generate a bounding box. For example, the confidence threshold may be 0.5 and if the class with the greatest value does not satisfy the threshold, a bounding box would not be generated and the query would be discarded. The final output of the detection stage can be a defined set of regression parameters representing the bounding box 520 and a classification 522 identifying the type of object.

In one embodiment, the set of parameters has the following parameters:
Regression parameters
0, 1, 2=X, Y, Z coordinate of box centroid
3, 4, 5=Width, length and height of the box
6, 7, 8=Velocity X, Velocity Y, Velocity Z
9, 10, 11=sin(yaw_orientation), cos(yaw_orienation), orientation bin Class parameters
Number of classes (7)+background class (1)

After the enriched queries 614 are processed at the detection stage 510, the perception system can determine a subset of the enriched queries 614 that will be used as scene dependent object queries 616 in the subsequent time step of the process. For example, the number of queries in the subset can be a fixed number such as 150, 200, 300, or any other subset of the enriched queries 614 generated by the decoder stage. In some embodiments, the subset may be based on a confidence value associated with a query. For example, the perception system 402 can select queries where there is sufficient confidence that the query is representative an object detected within the scene. For example, it may be based on testing that the threshold for determination that an object exists is a confidence threshold of 0.5. By selecting a defined number of enriched queries 614 to be included within the subset, the cutoff confidence threshold for queries included within the scene dependent object queries may not always have the same confidence value. In some embodiments, the queries may be selected based on the confidence value threshold. In which case the number of scene dependent object queries selected for the subsequent time step may change. The machine representation of the query encoding (e.g., a 256 value vector) is provided for each of the scene dependent object queries 616 that are provided to the subsequent time step.

As illustrated in FIG. 6B, the system is at t=1 or any subsequent time step after the initialization step. The scene dependent object queries are a subset of the enriched queries from the previous time step. These queries are the subset of enriched queries 614 determined at t=0. These queries are scene dependent object queries that represent the objects that were identified in the previous scene. These queries provide scene dependence that allows the decoder stage to more quickly converge on the identification of objects in the scene and provide for better object recognition. The scene dependent object queries 616 are added to the set of queries 604 that are generated for the next timestep. The total number of queries at the next time step will include the scene independent object queries 604 and the scene dependent object queries 616. The decoder stage will process both sets of queries. For example, the total number of queries being processed could be 900 scene independent object queries and 200 scene dependent object queries. The processing of the queries is conducted as described in FIG. 6A.

The scene dependent object queries can be helpful in making predictions in subsequent time steps when the scene data (e.g., images) are taken at an interval in which the difference between the scene data has not changed significantly. For example, in one embodiment, the time steps can be executed at a rate of 10 Hz. The rate of the time steps can be faster or slower based on the operation of the various systems. The network is initialized at t=0 and in subsequent time steps the scene dependent object queries are used to better detect the objects within the scene because the queries can converge more quickly than when using scene independent object queries.

The scene dependent object queries from the previous time step help to focus on objects that were previously detected. The scene independent object queries can help to detect objects that were missed during the previous detection stage and/or any objects that recently appeared in the field of view of the autonomous vehicle. In some instances, 90%+ of the scene dependent object queries are passed through to the next time step.

Initialization Stage

FIG. 7 is a flow diagram illustrating an example of a routine 700 implemented by at least one processor to navigate a vehicle based on at least one bounding box generated from one or more images in an initialization stage. The flow diagram illustrated in FIG. 7 is provided for illustrative purposes only. It will be understood that one or more of the steps of the routine illustrated in FIG. 7 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle compute 400 may be used.

At block 702, the perception system 402 receives images of a vehicle scene. As described herein, the images may correspond to different image sensors or cameras located at different positions around the vehicle. In combination, the images may represent a 360-degree view of an environment from the perspective of a vehicle.

At block 704, the perception system 402 generates feature maps based on the images. As described herein, in some cases, the perception system 402 generates at least one feature map for each received image. In some cases, the feature maps include a location relationship corresponding to the images from which they were generated. For example, adjoining or neighboring images may correspond to adjoining or neighboring feature maps. In certain cases, the perception system 402 generates the feature maps using an feature pyramid network such as, but not limited to Resnet or a feature pyramid network (FPN), etc. The feature maps may have a particular channel depth (e.g., 256, 512, etc.). As described herein, the feature maps may include features indicative of extracted characteristics of the image, such as but not limited to color, texture, location, reflectivity, shape, edges, etc.

The perception system 402 determines grid cells for the feature maps. As described herein, the grid cells may have a particular size and shape and may cover the entire set of feature maps. In some cases, there may be multiple rows and/or columns of grid cells with the rows being aligned or offset from one another.

At block 706, the perception system 402 generates scene independent object queries. As described herein, the perception system 402 may use features of a particular object query to identify one or more features from the feature maps that correspond to the particular object query. The perception system 402 may use the identified grid cells to modify the features of the particular object query. In some cases, the perception system 402 may weight the features of the identified one or more grid cells and use the weighted features to modify the features of the particular object query. In a similar way, the perception system 402 may modify the features of some or all of the object queries. In certain cases, as part of generating the object queries, the perception system 402 may use different feature maps (e.g., generated from a localization network that is different from the image feature extractor 504), and/or different data (e.g., heatmap data associated with a heatmap). Moreover, in certain cases, the perception system 402 may cross-attend (e.g., using the feature maps generated at block 804) or self-attend the object queries as part of the generation process.

At block 708, the perception system 402 enriches the object queries. As described herein, the perception system 402 may enrich the object queries in a variety of ways. The perception system may use a vision transformer having a decoder with a defined number of layers. The perception system 402 may iterate through each layer of the decoder until the defined number of layers has been completed. During the initialization stage, the defined number of layers used is greater than the number of layers used during the operation stage (such as described herein with respect to FIGS. 6B and 8). For example, during the initialization stage, the perception system may iterate through six layers of a decoder to enrich the scene independent object queries. During the initialization stage, the perception system is limited to using scene independent object queries, which are used to generate scene dependent object queries that can be used in subsequent time steps.

In some cases, the perception system 402 may enrich the object queries based on any one or any combination of: (enriched) feature maps (non-limiting example described herein at least with reference to object query cross-attention stage 514), features from other object queries (non-limiting example described herein at least with reference to object query self-attention stage 512), position encoding of object queries, and/or one or more processes (non-limiting example described herein at least with reference to the FFN stage 516). In certain cases, the perception system 402 may enrich the object queries based on features from other object queries. In some such cases, the feature map may be generated from the feature maps generated by an image feature network (e.g., image feature extractor 504).

As described herein, to enrich the object queries based on feature maps, the perception system 402 may perform a cross-attention function to determine a relationship between the object queries and the feature maps. The perception system 402 may identify grid cell(s) from the feature maps that correspond to the different object queries and use the features of the identified grid cells to enrich or modify the features of the respective object queries.

As described herein, to enrich the object queries based on the features of other object queries, the perception system 402 may perform a self-attention function to determine a relationship between the object queries (e.g., by comparing features of the different object queries). Based on the determined relationship, the perception system 402 may weight the features from the object queries relative to each other and use the weighted features from some or all of the object queries to modify the features of a particular object query. For example, to enrich a first object query, the perception system 402 may compare the features of the first object query to features of a set of at least one second object query and determine a relationship based on the comparison. The perception system 402 may further determine a weighting value to be applied to features from the set of at least one second object query to generated weighted features from the set of at least one second object query. The perception system 402 may then determine or modify one or more features of the first object query using the weighted values from the set of at least one object query. For example, as described herein, the perception system 402 may multiply the weighting value associated with a second object query by a particular feature of the second object query and use the weighted feature to determine or modify a corresponding feature of the first object query.

As described herein, to enrich the object queries based on a feature map, the perception system 402 may generate a feature map during the multi-view stage 503 (e.g., feature maps 602). The perception system 402 may use the features of the object queries to identify one or more grid cells in the feature map that correspond to the object queries and use the features of the grid cells to modify the features of the respective object queries. In some cases, the features from the grid cells/object queries may be weighted based on a determined relationship between the grid cells/object queries and the respective object queries being modified.

At block 710, the perception system outputs scene dependent object queries for a subsequent time step. After the enriched queries 614 are enriched, the perception system 402 can determine a subset of the enriched queries 614 that will be used as scene dependent object queries 616 in the subsequent time step of the process. For example, the number of queries in the subset can be a fixed number such as 150, 200, 300, or any other subset of the Enriched queries 614 generated by the decoder stage. In some embodiments, the subset may be based on a confidence value associated with a query. These queries are scene dependent object queries that represent the objects that were identified in the current scene. These queries provide scene dependence that allows the decoder to converge more quickly on the identification of objects in the scene and provide for better object recognition. The scene dependent object queries are added to the set of queries 604 that are generated for the next timestep. The total number of queries at the next time step will include the scene independent object queries 604 and the scene dependent object queries 616.

At block 712, the perception system 402 generates at least one bounding box based on the enriched object queries. As described herein, the perception system 402 may use one or more decoders to identify bounding boxes for objects in an image based on the enriched object queries. In some cases, the perception system 402 may use a feed forward network to process the enriched object queries. The perception system may generate an object classification associated with the bounding box. In certain cases, the more object queries used to generate the bounding boxes may result in improved accuracy of the bounding boxes.

At block 714, the perception system 402 causes the vehicle to be navigated based on the at least one bounding box. In some cases, the perception system 402 may communicate the bounding boxes to the planning system 404. The planning system 404 may use the bounding boxes to determine how to navigate a vehicle scene.

Fewer, more, or different steps may be included in the routine 700. For example, reference is made to the use of windows and correlating features of grid cells within windows, however, it will be understood that other groups of grid cells may be used, such as, but not limited to, grid cells that correspond to an outline (or approximation of an outline) of an object.

Moreover, the order of steps may be changed and/or some steps may be repeated. For example, the perception system 402 may repeat block 708, corresponding to different layers of the decoder stage 506. The perception system 402 may output the scene dependent object queries at block 710 after block 712.

Operation Stage

Figure 8:
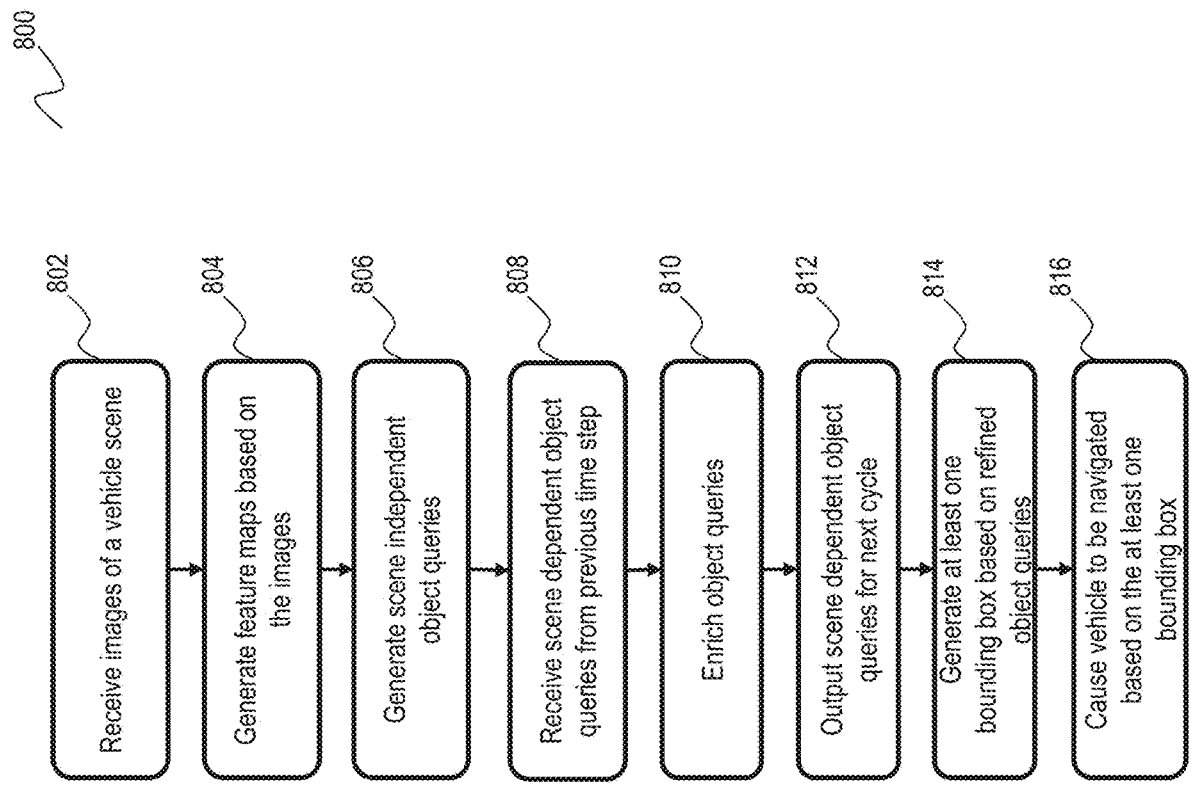
FIG. 8 is a flow diagram illustrating an example of a routine implemented by at least one processor to navigate a vehicle based on at least one bounding box generated from one or more images.

FIG. 8 is a flow diagram illustrating an example of a routine 800 implemented by at least one processor to navigate a vehicle based on at least one bounding box generated from one or more images using scene dependent object queries. The flow diagram illustrated in FIG. 8 is provided for illustrative purposes only. It will be understood that one or more of the steps of the routine illustrated in FIG. 8 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle compute 400 may be used.

At block 802, the perception system 402 receives images of a vehicle scene. As described herein, the images may correspond to different image sensors or cameras located at different positions around the vehicle. In combination, the images may represent a 360-degree view of an environment from the perspective of a vehicle.

At block 804, the perception system 402 generates feature maps based on the images, as described herein at least with reference to block 704 of FIG. 7.

At block 806, the perception system 402 generates scene independent object queries. As described herein, the perception system 402 may use features of a particular object query to identify one or more features from the feature maps that correspond to the particular object query. The perception system 402 may use the identified grid cells to modify the features of the particular object query. In some cases, the perception system 402 may weight the features of the identified one or more grid cells and use the weighted features to modify the features of the particular object query. In a similar way, the perception system 402 may modify the features of some or all of the object queries. In certain cases, as part of generating the object queries, the perception system 402 may use different feature maps (e.g., generated from a localization network that is different from the image feature extractor 504), and/or different data (e.g., heatmap data associated with a heatmap). Moreover, in certain cases, the perception system 402 may cross-attend (e.g., using the feature maps generated at block 804) or self-attend the object queries as part of the generation process.

At block 808, the perception system 402 receives scene dependent object queries from a previous time step. The generation and output of the scene dependent object queries are as described herein at least with reference to blocks 708 and 710 of FIG. 7.

At block 810, the perception system 402 enriches the object queries. As described herein, the perception system 402 may enrich the object queries in a variety of ways. The perception system may use a vision transformer having a decoder with a defined number of layers. The perception system 402 may iterate through each layer of the decoder until the defined number of layers has been completed. During the operation stage, the defined number of layers used is less than the number of layers used during the operation stage (such as described in FIGS. 6B and 8). The perception system 402 can converge more quickly when using scene dependent object queries and can better detect the objects within the scene.

In some cases, the perception system 402 may enrich the object queries based on any one or any combination of: (enriched) feature maps (non-limiting example described herein at least with reference to object query cross-attention stage 514), features from other object queries (non-limiting example described herein at least with reference to object query self-attention stage 512), position encoding of object queries, and/or one or more processes (non-limiting example described herein at least with reference to the FFN stage 516). In certain cases, the perception system 402 may enrich the object queries based on features from other object queries. In some such cases, the feature map may be generated from the feature maps generated by an image feature network (e.g., image feature extractor 504).

As described herein, to enrich the object queries based on feature maps, the perception system 402 may perform a cross-attention function to determine a relationship between the object queries and the feature maps. The perception system 402 may identify grid cell(s) from the feature maps that correspond to the different object queries and use the features of the identified grid cells to enrich or modify the features of the respective object queries.

As described herein, to enrich the object queries based on the features of other object queries, the perception system 402 may perform a self-attention function to determine a relationship between the scene dependent object queries and scene independent object queries (e.g., by comparing features of the different object queries). Based on the determined relationship, the perception system 402 may weight the features from the scene dependent object queries and scene independent object queries relative to each other and use the weighted features from some or all of the object queries to modify the features of a particular object query. For example, to enrich a first scene dependent object query, the perception system 402 may compare the features of the first scene dependent object query to features of a set of at least one second object query (a scene dependent object query or a scene independent object query) and determine a relationship based on the comparison. The perception system 402 may further determine a weighting value to be applied to features from the set of at least one second object query to generated weighted features from the set of at least one second object query. The perception system 402 may then determine or modify one or more features of the first scene dependent object query using the weighted values from the set of at least one object query. For example, as described herein, the perception system 402 may multiply the weighting value associated with a second object query by a particular feature of the second object query and use the weighted feature to determine or modify a corresponding feature of the first scene dependent object query.

As described herein, to enrich the object queries based on a feature map, the perception system 402 may generate a feature map during the multi-view stage 503 (e.g., feature maps 602). The perception system 402 may use the features of the object queries (scene dependent object queries and scene independent object queries) to identify one or more grid cells in the feature map that correspond to the object queries and use the features of the grid cells to modify the features of the respective object queries. In some cases, the features from the grid cells/object queries may be weighted based on a determined relationship between the grid cells/object queries and the respective object queries being modified. The perception system 402 may use an FFN to generate the enriched object queries.

At block 812, the perception system 402 outputs scene dependent object queries for use in a subsequent time step, as described herein at least with reference to block 710 of FIG. 7.

At block 814, the perception system 402 generates at least one bounding box based on the enriched object queries. As described herein, the perception system 402 may use one or more decoders to identify bounding boxes for objects in an image based on the enriched object queries. In some cases, the perception system 402 may use a feed forward network to process the enriched object queries. The perception system may generate an object classification associated with the bounding box. In certain cases, the more object queries used to generate the bounding boxes may result in improved accuracy of the bounding boxes.

At block 816, the perception system 402 causes the vehicle to be navigated based on the at least one bounding box, as described herein at least with reference to block 714 of FIG. 7.

Fewer, more, or different blocks can be used with routine 800. In some cases, any one or any combination of blocks from routine 700 may be combined with blocks from routine 800 or vice versa.

EXAMPLES

Various example embodiments of the disclosure can be described by the following clauses:

Clause 1. A method, comprising:
receiving a first plurality of images from a plurality of image sensors, the plurality of images corresponding to a plurality of views of a scene of a vehicle at a first time step;
generating a first plurality of feature maps based on the first plurality of images;
receiving a first set of object queries associated with the first time step;
enriching the first set of object queries based on the first plurality of feature maps to generate a first set of enriched object queries;
generating at least one bounding box for an object in the scene of the vehicle at the first time step based on the first set of enriched object queries;
generating a second set of enriched object queries based on the first set of enriched object queries, wherein the second set of enriched object queries is a subset of the first set of enriched object queries;

receiving a second plurality of images from the plurality of image sensors, the plurality of images corresponding to a plurality of views of a scene of the vehicle at a second time step;

generating a second plurality of feature maps based on the second plurality of images;

receiving a second set of object queries associated with the second time step;

receiving the second set of enriched object queries;

enriching the second set of object queries and the second set of enriched object queries based on the second plurality of feature maps to generate a third set of enriched object queries;

generating at least one bounding box for an object in the scene of the vehicle at the second time step based on the third set of enriched object queries; and causing the vehicle to be controlled based on the at least one bounding box.

Clause 2. The method of clause 1, wherein enriching the second set of object queries and the second set of enriched object queries comprises enriching the first set of object queries based on the second set of enriched object queries.

Clause 3. The method of any of clauses 1 or 2, wherein enriching the second set of object queries and the second set of enriched object queries based on the second plurality of feature maps comprises:

performing cross-attention computing functions between the second set of object queries and the second plurality of feature maps, and performing cross-attention computing functions between the second set of enriched object queries and the second plurality of feature maps.

Clause 4. The method of any of clauses 1-3, wherein enriching the first set of object queries comprises iterating through a first number of layers of a decoder to provide the first set of enriched object queries.

Clause 5. The method of clause 4, wherein enriching the second set of object queries and the second set of enriched object queries comprises iterating through a second number of layers of the decoder to provide the third set of enriched object queries, wherein the second number of layers is less than the first number of layers.

Clause 6. The method of any of clauses 1-5, wherein generating at least one bounding box for an object in the scene of the vehicle based on the third set of enriched object queries comprises generating a classification of an object type of individual bounding boxes, and wherein causing the vehicle to be controlled based on the at least one bounding box comprises causing the vehicle to be controlled based on the classification.

Clause 7. The method of any of clauses 1-6, wherein the second set of enriched object queries is a defined number of queries of the first set of enriched object queries.

Clause 8. The method of any of clauses 1-7, wherein individual image sensors of the plurality of image sensors are placed at different orientations around the vehicle.

Clause 9. The method of any of clauses 1-8, wherein the first set of object queries and the second set of object queries are the same.

Clause 10. A system, comprising:

a data store storing computer-executable instructions; and a processor configured to execute the computer-executable instructions, wherein execution of the computer-executable instructions causes the system to:

receive a first plurality of images from a plurality of image sensors, the plurality of images corresponding to a plurality of views of a scene of a vehicle at a first time step;

generate a first plurality of feature maps based on the first plurality of images;

receive a first set of object queries associated with the first time step;

enrich the first set of object queries based on the first plurality of feature maps to generate a first set of enriched object queries;

generate at least one bounding box for an object in the scene of the vehicle at the first time step based on the first set of enriched object queries;

generate a second set of enriched object queries based on the first set of enriched object queries, wherein the second set of enriched object queries is a subset of the first set of enriched object queries;

receive a second plurality of images from the plurality of image sensors, the plurality of images corresponding to a plurality of views of a scene of the vehicle at a second time step;

generate a second plurality of feature maps based on the second plurality of images;

receive a second set of object queries associated with the second time step;

receive the second set of enriched object queries;

enrich the second set of object queries and the second set of enriched object queries based on the second plurality of feature maps to generate a third set of enriched object queries;

generate at least one bounding box for an object in the scene of the vehicle at the second time step based on the third set of enriched object queries; and cause the vehicle to be controlled based on the at least one bounding box.

Clause 11. The system of clause 10, wherein to enrich the second set of object queries and the second set of enriched object queries, the processor is configured to enrich the first set of object queries based on the second set of enriched object queries.

Clause 12. The system of any of clauses 10 or 11, wherein to enrich the second set of object queries and the second set of enriched object queries based on the second plurality of feature maps, the processor is configured to:

perform cross-attention computing functions between the second set of object queries and the second plurality of feature maps, and perform cross-attention computing functions between the second set of enriched object queries and the second plurality of feature maps.

Clause 13. The system of any of clauses 10-12, wherein to enrich the first set of object queries, the processor is configured to iterate through a first number of layers of a decoder to provide the first set of enriched object queries.

Clause 14. The system of clause 13, wherein to enrich the second set of object queries and the second set of enriched object queries, the processor is configured to iterate through a second number of layers of the decoder to provide the third set of enriched object queries, wherein the second number of layers is less than the first number of layers.

Clause 15. The system of any of clauses 10-14, wherein to generate at least one bounding box for an object in the scene of the vehicle based on the second set of enriched object queries, the processor is configured to generate a classification of an object type of individual bounding boxes, and wherein to cause the vehicle to be controlled based on the at least one bounding box, the processor is configured to cause the vehicle to be controlled based on the classification.

Clause 16. The system of any of clauses 10-15, wherein the second set of enriched object queries is a defined number of queries of the first set of enriched object queries.

Clause 17. The system of any of clauses 10-16, wherein individual image sensors of the plurality of image sensors are placed at different orientations around the vehicle.

Clause 18. The system of any of clauses 10-17, wherein the first set of object queries and the second set of object queries are the same.

Clause 19. Non-transitory computer-readable media comprising computer-executable instructions that, when executed by a computing system, causes the computing system to:
receive a first plurality of images from a plurality of image sensors, the plurality of images corresponding to a plurality of views of a scene of a vehicle at a first time step;
generate a first plurality of feature maps based on the first plurality of images;
receive a first set of object queries associated with the first time step;
enrich the first set of object queries based on the first plurality of feature maps to generate a first set of enriched object queries;
generate at least one bounding box for an object in the scene of the vehicle at the first time step based on the first set of enriched object queries;
generate a second set of enriched object queries based on the first set of enriched object queries, wherein the second set of enriched object queries is a subset of the first set of enriched object queries;
receive a second plurality of images from the plurality of image sensors, the plurality of images corresponding to a plurality of views of a scene of the vehicle at a second time step;
generate a second plurality of feature maps based on the second plurality of images;
receive a second set of object queries associated with the second time step;
receive the second set of enriched object queries;
enrich the second set of object queries and the second set of enriched object queries based on the second plurality of feature maps to generate a third set of enriched object queries;
generate at least one bounding box for an object in the scene of the vehicle at the second time step based on the third set of enriched object queries; and
cause the vehicle to be controlled based on the at least one bounding box.

Clause 20. The non-transitory computer-readable media of clause 19, wherein to enrich the second set of object queries and the second set of enriched object queries, the computing system is configured to enrich the second set of object queries based on the second set of enriched object queries.

Clause 21. The non-transitory computer-readable media of any of clauses 19 or 20, wherein to enrich the second set of object queries and the second set of enriched object queries based on the second plurality of feature maps, the computing system is configured to:
perform cross-attention computing functions between the second set of object queries and the second plurality of feature maps, and
perform cross-attention computing functions between the second set of enriched object queries and the second plurality of feature maps.

Clause 22. The non-transitory computer-readable media of any of clauses 19-21, wherein to enrich the first set of object queries, the computing system is configured to iterate through a first number of layers of a decoder to provide the first set of enriched object queries.

Clause 23. The non-transitory computer-readable media of clause 22, wherein to enrich the second set of object queries and the second set of enriched object queries, the computing system is configured to iterate through a second number of layers of the decoder to provide the third set of enriched object queries, wherein the second number of layers is less than the first number of layers.

Clause 24. The non-transitory computer-readable media of any of clauses 19-23, wherein to generate at least one bounding box for an object in the scene of the vehicle based on the second set of enriched object queries, the processor is configured to generate a classification of an object type of individual bounding boxes, and
wherein to cause the vehicle to be controlled based on the at least one bounding box, the processor is configured to cause the vehicle to be controlled based on the classification.

Clause 25. The non-transitory computer-readable media of any of clauses 19-24, wherein the second set of enriched object queries is a defined number of queries of the first set of enriched object queries.

Clause 26. The non-transitory computer-readable media of any of clauses 19-25, wherein individual image sensors of the plurality of image sensors are placed at different orientations around the vehicle.

Clause 27. The non-transitory computer-readable media of any of clauses 19-26, wherein the first set of object queries and the second set of object queries are the same.

Additional Examples

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
   receiving a first plurality of images from a plurality of image sensors, the plurality of images corresponding to a plurality of views of a scene of a vehicle at a first time step;
   generating a first plurality of feature maps based on the first plurality of images;
   receiving a first set of object queries associated with the first time step;
   enriching the first set of object queries based on the first plurality of feature maps to generate a first set of enriched object queries;
   generating at least one bounding box for an object in the scene of the vehicle at the first time step based on the first set of enriched object queries;
   determining a confidence value associated with each object query of the first set of enriched object queries;
   generating a second set of enriched object queries based, at least in part, on the confidence values associated with the first set of enriched object queries, wherein the second set of enriched object queries is a subset of the first set of enriched object queries;
   receiving a second plurality of images from the plurality of image sensors, the plurality of images corresponding to a plurality of views of a scene of the vehicle at a second time step;
   generating a second plurality of feature maps based on the second plurality of images;
   receiving a second set of object queries associated with the second time step;
   receiving the second set of enriched object queries;
   enriching the second set of object queries and the second set of enriched object queries based on the second plurality of feature maps to generate a third set of enriched object queries;
   generating at least one bounding box for an object in the scene of the vehicle at the second time step based on the third set of enriched object queries; and
   causing the vehicle to be controlled based on the at least one bounding box.

2. The method of claim 1, wherein enriching the second set of object queries and the second set of enriched object queries comprises enriching the first set of object queries based on the second set of enriched object queries.

3. The method of claim 1, wherein enriching the second set of object queries and the second set of enriched object queries based on the second plurality of feature maps comprises:
performing cross-attention computing functions between the second set of object queries and the second plurality of feature maps, and
performing cross-attention computing functions between the second set of enriched object queries and the second plurality of feature maps.

4. The method of claim 1, wherein enriching the first set of object queries comprises iterating through a first number of layers of a decoder to provide the first set of enriched object queries.

5. The method of claim 4, wherein enriching the second set of object queries and the second set of enriched object queries comprises iterating through a second number of layers of the decoder to provide the third set of enriched object queries, wherein the second number of layers is less than the first number of layers.

6. The method of claim 1, wherein generating at least one bounding box for an object in the scene of the vehicle based on the third set of enriched object queries comprises generating a classification of an object type of individual bounding boxes, and
wherein causing the vehicle to be controlled based on the at least one bounding box comprises causing the vehicle to be controlled based on the classification.

7. The method of claim 1, wherein the second set of enriched object queries is a defined number of queries selected from the first set of enriched object queries, object queries in the second set of enriched object queries having a higher confidence value than unselected object queries in the first set of enriched object queries.

8. The method of claim 1, wherein individual image sensors of the plurality of image sensors are placed at different orientations around the vehicle.

9. The method of claim 1, wherein the first set of object queries and the second set of object queries are the same.

10. A system, comprising:
a data store storing computer-executable instructions; and
a processor configured to execute the computer-executable instructions, wherein execution of the computer-executable instructions causes the system to:
receive a first plurality of images from a plurality of image sensors, the plurality of images corresponding to a plurality of views of a scene of a vehicle at a first time step;
generate a first plurality of feature maps based on the first plurality of images;
receive a first set of object queries associated with the first time step;
enrich the first set of object queries based on the first plurality of feature maps to generate a first set of enriched object queries;
generate at least one bounding box for an object in the scene of the vehicle at the first time step based on the first set of enriched object queries;
determine a confidence value associated with each object query of the first set of enriched object queries;
generate a second set of enriched object queries based, at least in part, on the confidence values associated with the first set of enriched object queries, wherein the second set of enriched object queries is a subset of the first set of enriched object queries;
receive a second plurality of images from the plurality of image sensors, the plurality of images corresponding to a plurality of views of a scene of the vehicle at a second time step;
generate a second plurality of feature maps based on the second plurality of images;
receive a second set of object queries associated with the second time step;
receive the second set of enriched object queries;
enrich the second set of object queries and the second set of enriched object queries based on the second plurality of feature maps to generate a third set of enriched object queries;
generate at least one bounding box for an object in the scene of the vehicle at the second time step based on the third set of enriched object queries; and
cause the vehicle to be controlled based on the at least one bounding box.

11. The system of claim 10, wherein to enrich the second set of object queries and the second set of enriched object queries, the processor is configured to enrich the first set of object queries based on the second set of enriched object queries.

12. The system of claim 10, wherein to enrich the second set of object queries and the second set of enriched object queries based on the second plurality of feature maps, the processor is configured to:
perform cross-attention computing functions between the second set of object queries and the second plurality of feature maps, and
perform cross-attention computing functions between the second set of enriched object queries and the second plurality of feature maps.

13. The system of claim 10, wherein to enrich the first set of object queries, the processor is configured to iterate through a first number of layers of a decoder to provide the first set of enriched object queries.

14. The system of claim 13, wherein to enrich the second set of object queries and the second set of enriched object queries, the processor is configured to iterate through a second number of layers of the decoder to provide the third set of enriched object queries, wherein the second number of layers is less than the first number of layers.

15. The system of claim 10, wherein to generate at least one bounding box for an object in the scene of the vehicle based on the second set of enriched object queries, the processor is configured to generate a classification of an object type of individual bounding boxes, and
wherein to cause the vehicle to be controlled based on the at least one bounding box, the processor is configured to cause the vehicle to be controlled based on the classification.

16. Non-transitory computer-readable media comprising computer-executable instructions that, when executed by a computing system, causes the computing system to:
receive a first plurality of images from a plurality of image sensors, the plurality of images corresponding to a plurality of views of a scene of a vehicle at a first time step;
generate a first plurality of feature maps based on the first plurality of images;
receive a first set of object queries associated with the first time step;

enrich the first set of object queries based on the first plurality of feature maps to generate a first set of enriched object queries;
generate at least one bounding box for an object in the scene of the vehicle at the first time step based on the first set of enriched object queries;
determine a confidence value associated with each object query of the first set of enriched object queries;
generate a second set of enriched object queries based, at least in part, on the confidence values associated with the first set of enriched object queries, wherein the second set of enriched object queries is a subset of the first set of enriched object queries;
receive a second plurality of images from the plurality of image sensors, the plurality of images corresponding to a plurality of views of a scene of the vehicle at a second time step;
generate a second plurality of feature maps based on the second plurality of images;
receive a second set of object queries associated with the second time step;
receive the second set of enriched object queries;
enrich the second set of object queries and the second set of enriched object queries based on the second plurality of feature maps to generate a third set of enriched object queries;
generate at least one bounding box for an object in the scene of the vehicle at the second time step based on the third set of enriched object queries; and
cause the vehicle to be controlled based on the at least one bounding box.

17. The non-transitory computer-readable media of claim 16, wherein to enrich the second set of object queries and the second set of enriched object queries, the computing system is configured to enrich the second set of object queries based on the second set of enriched object queries.

18. The non-transitory computer-readable media of claim 16, wherein to enrich the second set of object queries and the second set of enriched object queries based on the second plurality of feature maps, the computing system is configured to:
   perform cross-attention computing functions between the second set of object queries and the second plurality of feature maps, and
   perform cross-attention computing functions between the second set of enriched object queries and the second plurality of feature maps.

19. The non-transitory computer-readable media of claim 16, wherein to enrich the first set of object queries, the computing system is configured to iterate through a first number of layers of a decoder to provide the first set of enriched object queries.

20. The non-transitory computer-readable media of claim 19, wherein to enrich the second set of object queries and the second set of enriched object queries, the computing system is configured to iterate through a second number of layers of the decoder to provide the third set of enriched object queries, wherein the second number of layers is less than the first number of layers.

* * * * *